US011924366B2

United States Patent
Gardella et al.

(10) Patent No.: US 11,924,366 B2
(45) Date of Patent: *Mar. 5, 2024

(54) COORDINATED SESSION CHARGING IN ROAMING SCENARIOS

(71) Applicant: NOKIA TECHNOLOGIES OY, Espoo (FI)

(72) Inventors: Maryse Gardella, Velizy (FR); Gerald Goermer, Wandlitz (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 39 days.

This patent is subject to a terminal disclaimer.

(21) Appl. No.: 17/871,377

(22) Filed: Jul. 22, 2022

(65) Prior Publication Data
US 2022/0360671 A1 Nov. 10, 2022

Related U.S. Application Data

(63) Continuation of application No. 17/267,599, filed as application No. PCT/EP2018/071802 on Aug. 10, 2018, now Pat. No. 11,451,673.

(51) Int. Cl.
*H04M 15/00* (2006.01)
*H04L 12/14* (2006.01)

(52) U.S. Cl.
CPC .... *H04M 15/8038* (2013.01); *H04L 12/1403* (2013.01); *H04M 15/62* (2013.01);
(Continued)

(58) Field of Classification Search
CPC ............. H04M 15/8038; H04M 15/62; H04M 15/8228; H04L 12/1403
(Continued)

(56) References Cited

U.S. PATENT DOCUMENTS 9,467,301 B2 * 10/2016 Goermer ............. H04L 12/1446
10,182,322 B2 * 1/2019 Chai ....................... H04W 4/24
(Continued)

FOREIGN PATENT DOCUMENTS

| CN | 103891347 A | 6/2014 |
| CN | 103918306 A | 7/2014 |

(Continued)

OTHER PUBLICATIONS

International Search Report and Written Opinion dated Oct. 15, 2008 corresponding to International Patent Application No. PCT/EP2018/071802. No copy provided, per MPEP 609. Copy submitted in parent U.S. Appl. No. 17/267,599.
(Continued)

*Primary Examiner* — Pakee Fang
(74) *Attorney, Agent, or Firm* — SQUIRE PATTON BOGGS (US) LLP

(57) ABSTRACT

There are provided measures for coordinated session charging in roaming scenarios. Such measures (of a first session management entity of a first mobile network in a roaming charging related scenario between said first mobile network and a second mobile network) exemplarily comprise transmitting a session creation request message to a second session management entity of said second mobile network, said session creation request message including information indicative of a first configuration utilized for mobile network related charging, and receiving a session creation response message from said second session management entity of said second mobile network, said session creation response message including information indicative of a second configuration utilized for mobile network related charging.

10 Claims, 20 Drawing Sheets

(52) U.S. Cl.
CPC ........ *H04M 15/8228* (2013.01); *H04M 15/41* (2013.01); *H04M 15/67* (2013.01)

(58) Field of Classification Search
USPC .......................................................... 455/406
See application file for complete search history.

(56) References Cited

U.S. PATENT DOCUMENTS

| | | | |
|---|---|---|---|
| 2009/0088129 | A1 | 4/2009 | Cai et al. |
| 2010/0009675 | A1* | 1/2010 | Wijting ................. H04W 76/14 709/228 |
| 2011/0077058 | A1 | 3/2011 | Cai et al. |
| 2011/0159848 | A1 | 6/2011 | Cai et al. |
| 2015/0319594 | A1 | 11/2015 | Li et al. |
| 2016/0316326 | A1 | 10/2016 | Burroughs et al. |
| 2017/0181037 | A1 | 6/2017 | Zaghloul et al. |

FOREIGN PATENT DOCUMENTS

| | | |
|---|---|---|
| CN | 103929725 A | 7/2014 |
| CN | 104853332 A | 8/2015 |

OTHER PUBLICATIONS

3GPP TS 32.255 V2.0.0 (Sep. 2018), Technical Specification, 3rd Generation Partnership Project; Technical Specification Group Services and System Aspects; Telecommunication management; Charging management; 5G Data connectivity domain charging; stage 2 (Release 15), Sep. 6, 2018, pp. 1-72, XP051475240. No copy provided, per MPEP 609. Copy submitted in parent U.S. Appl. No. 17/267,599.
3GPP TS 32.255 V1.1.0 (Jul. 2018), Technical Specification, 3rd Generation Partnership Project; Technical Specification Group Services and System Aspects; Telecommunication management; Charging management; 5G Data connectivity domain charging; stage 2 (Release 15), Jul. 6, 2018, pp. 1-53, XP051474799. No copy provided, per MPEP 609. Copy submitted in parent U.S. Appl. No. 17/267,599.
3GPP TS 32.298 V15.3.0 (Jun. 2018), Technical Specification, 3rd Generation Partnership Project; Technical Specification Group Services and System Aspects; Telecommunication management; Charging management; Charging Data Record (CDR) parameter description (Release 15), Jun. 21, 2018, pp. 1-214, XP051473053. No copy provided, per MPEP 609. Copy submitted in parent U.S. Appl. No. 17/267,599.
3GPP TS 32.251 V15.3.0 (Jun. 2018), Technical Specification, 3rd Generation Partnership Project; Technical Specification Group Services and System Aspects; Telecommunication management; Charging management; Packet Switched (PS) domain charging (Release 15), Jun. 21, 2018, pp. 1-187, XP051473049. No copy provided, per MPEP 609. Copy submitted in parent U.S. Appl. No. 17/267,599.
3GPP TS 32.291 V0.4.0 (Jun. 2018), Technical Specification, 3rd Generation Partnership Project; Technical Specification Group Services and System Aspects; Telecommunication management; Charging management; 5G system, Charging service; stage 3 (Release 15), Jul. 9, 2018, pp. 1-31, XP051474935. No copy provided, per MPEP 609. Copy submitted in parent U.S. Appl. No. 17/267,599.
Huawei Technologies, "pCR TS 32.255 CDR Generation," 3GPP Draft; S5-183375, 3GPP TSG SA WG5 (Telecom Management) Meeting #119, La Jolla, US, May 18, 2018, XP051457731. No copy provided, per MPEP 609. Copy submitted in parent U.S. Appl. No. 17/267,599.
Indian Office Action corresponding to IN Application No. 202147008600, dated Jan. 25, 2022. No copy provided, per MPEP 609. Copy submitted in parent U.S. Appl. No. 17/267,599.
Chinese Office Action corresponding to CN Application No. 201880098600.2, dated Dec. 10, 2021. No copy provided, per MPEP 609. Copy submitted in parent U.S. Appl. No. 17/267,599.

* cited by examiner

COORDINATED SESSION CHARGING IN ROAMING SCENARIOS

CROSS-REFERENCE TO RELATED APPLICATION

This application is a 37 C.F.R. § 1.53(b) continuation of co-pending U.S. patent application Ser. No. 17/267,599 filed Feb. 10, 2021, which is the National Stage of PCT International Application No. PCT/EP2018/071802, filed on Aug. 10, 2018. The entire content of the above-referenced applications is hereby incorporated by reference.

FIELD

The present invention relates to coordinated session charging in roaming scenarios. More specifically, the present invention exemplarily relates to measures (including methods, apparatuses and computer program products) for realizing coordinated session charging in roaming scenarios.

BACKGROUND

The present specification generally relates to provision of reliable and less elaborate techniques for the coordination of charging in roaming scenarios. This coordination of charging in roaming scenarios may comprise synchronization and/or mirroring of charging in roaming scenarios.

The business operation for mobile communication services was dramatically impacted since the transfer from circuit switched system to all internet protocol (IP) networks.

At present, the revenue operation is still continuing with the rules which are specified by Global System for Mobile communication Association (GSMA) in the transfer account procedure (TAP) specification framework. These rules are based on three criteria for the revenue calculation: time for voice calls, volume for data service and counts for short message service (SMS). In 3G networks ($3^{rd}$ Generation networks) was the dominance of voice calls most relevant, and in 4G ($4^{th}$ Generation) Long Term Evolution (LTE) networks was the growing of data services most relevant for the revenue calculation.

The profit generated from time based calculation justified spending effort on volume based charging in particular in case of roaming.

With the new European Union (EU) roaming regulation, mobile provider's revenue decreased significantly due to released roaming fees for time and volume based charging. Spending effort for volume based charging is no longer acceptable because of the more complicated correlation calculation in respect of voice service as one of the IP based service.

On top of this adaptation in respect of the service aspect (voice versus other IP services) is the switch to the 5G ($5^{th}$ Generation) access technology with a New Radio (NR) concept with pure data packet treatment.

Charging specification 3GPP TS 32.255 (3GPP: $3^{rd}$ Generation Partnership Project, TS: Technical Specification) defines charging—for 5G—of data connectivity (PDU (protocol data unit) session) and in particular for a roaming home routed scenario to fulfil the 5G requirements for the collection of the corresponding usage data for charging.

The functional 5G charging architecture according to this specification and also TS 32.290 specify a central charging function (CHF) exposing a converged charging service. It is possible for the CHF in this architecture to supply charging triggers to network function(s) (NF) which override some triggers and thresholds configured in these network function(s) NF, such as thresholds in charging characteristics. In case of roaming, these triggers can be supplied in both Visited Public Land Mobile Network (V-PLMN or VPLMN) and Home Public Land Mobile Network (H-PLMN or HPLMN) for mobile subscriptions treated in the V-PLMN, called in-bound roamers, and for the treatment of these subscriptions in the H-PLMN, called out-bound roamers, respectively.

Known techniques involve at least two disadvantages.

Namely, on the one hand (first disadvantage), these known techniques need complex processing on charging data records (CDR) for revenue consolidation.

In particular, in Evolved Packet Core (EPC), such settlement between Visited-PLMN and Home-PLMN relies on information in CDRs generated on both sides with partial records which are different.

When IP connectivity access network (IP-CAN) bearer charging is employed, then S-GW CDRs are generated in V-PLMN per bearer, and P-GW CDRs are generated in H-PLMN per bearer. However, the settlement from S-GW QoS containers in V-PLMN and "Flow based charging" containers in PGW-CDRs may be inaccurate (packets entering in H-PLMN can be dropped in PGW due to PCC rules enforcement) and it is not trivial also due to lack of synchronization between the partial CDRs generation and closing the containers governed by charging characteristics thresholds and also other triggers in respective PLMNs, which are different in V-PLMN (S-GW) and H-PLMN (P-GW).

When charging per IP-CAN session is employed, then S-GW CDRs are generated in V-PLMN per bearer, and PGW-CDRs are generated in H-PLMN per IP-CAN session (i.e. PDN connection), and IP-CAN bearer charging is performed as well. However, the settlement from S-GW QoS containers in V-PLMN and "IP-CAN bearer charging" (i.e. traffic data volumes) containers in PGW-CDRs is also complex due to lack of synchronization between the partial CDRs generation and closing the containers on both sides with triggers which are different in V-PLMN (S-GW) and H-PLMN (P-GW).

The charging characteristics (CC) are defined as profiles and behaviors, which are not standardized. Therefore, it cannot be guaranteed that CDRs generation based on the CC fulfils the expectation from the roaming partners.

For operators to be able to increase their revenue when deploying 5G networks by establishing roaming agreement with partners also deploying 5G networks, it is important to introduce mechanisms for facilitating revenue consolidation between them.

Further, on the other hand (second disadvantage), these known techniques provide a single ConvergedCharging service for two purposes.

Namely, in Rel-15 there is only one service (i.e. ConvergedCharging) specified for the charging function (CHF). In a home routed roaming case, this service is invoked similarly as for a PDU session in a non-roaming case, with a SMF-PDU-CDR generated, with the difference that per "QFI counts" are generated in the SMF of the H-PLMN (H-SMF) and expected to be added in SMF-PDU-CDR, in addition to PCC-based counts (per Rating group or Rating group+ service Id), using a single charging session, and per "QFI counts" are generated in the V-SMF of the V-PLMN (V-SMF) and this is no more detailed, except a potential V-SMF CDR to be generated with these counts.

However, this per "QFI counts" for "QoS based charging" are separate from per "Rating group or Rating group+ service Id" counts related to the "flow based charging". Also, if the triggers need to be different between "flow based charging" and "QoS based charging" due to the second set ("QoS based charging"), synchronization between V-PLMN and H-PLMN is required. The same ConvergedCharging service is used simultaneously for two different purposes.

Besides that, use of the NRF framework by NF(s) is known. The CHF is also an NF exposing service(s), and can also use this framework, but the details for using this framework has presently not been discussed.

FIG. 15 shows a schematic diagram of an example of a CHF in an environment providing a framework including further NFs and an NF PCF.

The ConvergedCharging service exposed by CHF via Nchf covers several generic functionalities, for example quota management, without quota management (offline), and CDRs generation.

The single ConvergedCharging service exposed by CHF is provided as a block and not flexible enough to allow CHF deployments for offering some services which can be independent.

However, some services are independent from the subscriber's account/balance: e.g. offline for roamers.

Although the ConvergedCharging service is known as a generic service, when invoked by the session management function (SMF), the CHF needs to support the SMF-specific data and behavior, including generation of specific SMF-PDU-CDR.

Later on, if invoked from an IMS Node, the CHF will need to support IMS-specific data and behavior, including generation of specific IMS CDRs.

When the ConvergedCharging service offered by CHF needs to be associated to a given subscriber account/balance, it is possible to have deployment of multiple CHFs distributed based on Subscription Permanent Identifier (SUPI) ranges and introduce CHF discovery by the NF based on SUPI.

However, for a given subscriber (or SUPI) there is no solution for a CHFs deterministics distribution, especially when new NF features (e.g. from a new 5G NF) are introduced or a new NF is introduced and a dedicated CHF (separated) for providing the ConvergedCharging service is preferred.

In this regard, it is noted that prior to SGC, when using Ro/Rf interfaces from network elements to charging servers, it was possible to use the service-context-Id AVP to route towards dedicated charging server based on domain/service charging specifications, but this relies on configuration, and does not provide capability of flexible deployments.

Hence, the problem arises that less elaborate techniques for the coordination of charging in roaming scenarios are not available.

Hence, there is a need to provide for coordinated session charging in roaming scenarios.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a first session management entity of a first mobile network in a roaming charging related scenario between said first mobile network and a second mobile network, the method comprising transmitting a session creation request message to a second session management entity of said second mobile network, said session creation request message including information indicative of a first configuration utilized for mobile network related charging, and receiving a session creation response message from said second session management entity of said second mobile network, said session creation response message including information indicative of a second configuration utilized for mobile network related charging.

According to an exemplary aspect of the present invention, there is provided a method of a charging entity of a first mobile network in a roaming charging related scenario between said first mobile network and a second mobile network, the method comprising receiving, from a session management entity of said first mobile network, a charging initiation request message, and transmitting, to said session management entity of said first mobile network, a charging initiation response message, said charging initiation response message being indicative of success of a generation of partial charging data records in said first mobile network and including information indicative of a first configuration utilized for mobile network related charging.

According to an exemplary aspect of the present invention, there is provided a method of a second session management entity of a second mobile network in a roaming charging related scenario between a first mobile network and said second mobile network, the method comprising receiving, from a first session management entity of said first mobile network, a session creation request message, said session creation request message including information indicative of a first configuration utilized for mobile network related charging, and transmitting, to said first session management entity of said first mobile network, a session creation response message, said session creation response message including information indicative of a second configuration utilized for mobile network related charging.

According to an exemplary aspect of the present invention, there is provided a method of a charging entity of a second mobile network in a roaming charging related scenario between a first mobile network and said second mobile network, the method comprising receiving, from a session management entity of said second mobile network, a charging initiation request message, said charging initiation request message including information indicative of a first configuration utilized for mobile network related charging for generation of partial charging data records in said second mobile network, and transmitting, to said session management entity of said second mobile network, a charging initiation response message, said charging initiation response message being indicative of success of said generation of said partial charging data records in said second mobile network and including information indicative of said second configuration utilized for mobile network related charging.

According to an exemplary aspect of the present invention, there is provided a method in a roaming charging related scenario between a first mobile network and a second mobile network, the method comprising transmitting, from a first session management entity of said first mobile network to a second session management entity of said second mobile network, a session creation request message, said session creation request message including information indicative of a first configuration utilized for mobile network related charging, transmitting, from said second session management entity of said second mobile network to a second charging entity of said second mobile network, a charging initiation request message, said charging initiation request message including information indicative of said first configuration utilized for mobile network related charging for generation of partial charging data records in said second mobile network, transmitting, from said second charging entity of said second mobile network to said second session management entity of said second mobile network, a charging initiation response message, said charging initiation response message being indicative of success of said generation of said partial charging data records in said second mobile network and including information indicative of said second configuration utilized for mobile network related charging, and transmitting, from said second session management entity of said second mobile network to said first session management entity of said first mobile network, a session creation response message, said session creation response message including information indicative of said second configuration utilized for mobile network related charging.

According to an exemplary aspect of the present invention, there is provided an apparatus of a first session management entity of a first mobile network in a roaming charging related scenario between said first mobile network and a second mobile network, the apparatus comprising at least one processor, at least one memory including computer program code, and at least one interface configured for communication with at least another apparatus, the at least one processor, with the at least one memory and the computer program code, being configured to cause the apparatus to perform transmitting a session creation request message to a second session management entity of said second mobile network, said session creation request message including information indicative of a first configuration utilized for mobile network related charging, and receiving a session creation response message from said second session management entity of said second mobile network, said session creation response message including information indicative of a second configuration utilized for mobile network related charging.

According to an exemplary aspect of the present invention, there is provided an apparatus of a charging entity of a first mobile network in a roaming charging related scenario between said first mobile network and a second mobile network, the apparatus comprising at least one processor, at least one memory including computer program code, and at least one interface configured for communication with at least another apparatus, the at least one processor, with the at least one memory and the computer program code, being configured to cause the apparatus to perform receiving, from a session management entity of said first mobile network, a charging initiation request message, and transmitting, to said session management entity of said first mobile network, a charging initiation response message, said charging initiation response message being indicative of success of a generation of partial charging data records in said first mobile network and including information indicative of a first configuration utilized for mobile network related charging.

According to an exemplary aspect of the present invention, there is provided an apparatus of a second session management entity of a second mobile network in a roaming charging related scenario between a first mobile network and said second mobile network, the apparatus comprising at least one processor, at least one memory including computer program code, and at least one interface configured for communication with at least another apparatus, the at least one processor, with the at least one memory and the computer program code, being configured to cause the apparatus to perform receiving, from a first session management entity of said first mobile network, a session creation request message, said session creation request message including information indicative of a first configuration utilized for mobile network related charging, and transmitting, to said first session management entity of said first mobile network, a session creation response message, said session creation response message including information indicative of a second configuration utilized for mobile network related charging.

According to an exemplary aspect of the present invention, there is provided an apparatus of a charging entity of a second mobile network in a roaming charging related scenario between a first mobile network and said second mobile network, the apparatus comprising at least one processor, at least one memory including computer program code, and at least one interface configured for communication with at least another apparatus, the at least one processor, with the at least one memory and the computer program code, being configured to cause the apparatus to perform receiving, from a session management entity of said second mobile network, a charging initiation request message, said charging initiation request message including information indicative of a first configuration utilized for mobile network related charging for generation of partial charging data records in said second mobile network, and transmitting, to said session management entity of said second mobile network, a charging initiation response message, said charging initiation response message being indicative of success of said generation of said partial charging data records in said second mobile network and including information indicative of said second configuration utilized for mobile network related charging.

According to an exemplary aspect of the present invention, there is provided an apparatus of a first session management entity of a first mobile network in a roaming charging related scenario between said first mobile network and a second mobile network, the apparatus comprising transmitting circuitry configured to transmit a session creation request message to a second session management entity of said second mobile network, said session creation request message including information indicative of a first configuration utilized for mobile network related charging, and receiving circuitry configured to receive a session creation response message from said second session management entity of said second mobile network, said session creation response message including information indicative of a second configuration utilized for mobile network related charging.

According to an exemplary aspect of the present invention, there is provided an apparatus of a charging entity of a first mobile network in a roaming charging related scenario between said first mobile network and a second mobile network, the apparatus comprising receiving circuitry configured to receive, from a session management entity of said first mobile network, a charging initiation request message, and transmitting circuitry configured to transmit, to said session management entity of said first mobile network, a charging initiation response message, said charging initiation response message being indicative of success of a generation of partial charging data records in said first mobile network and including information indicative of a first configuration utilized for mobile network related charging.

According to an exemplary aspect of the present invention, there is provided an apparatus of a second session management entity of a second mobile network in a roaming charging related scenario between a first mobile network and said second mobile network, the apparatus comprising receiving circuitry configured to receive, from a first session management entity of said first mobile network, a session creation request message, said session creation request message including information indicative of a first configuration utilized for mobile network related charging, and transmitting circuitry configured to transmit, to said first session management entity of said first mobile network, a session creation response message, said session creation response message including information indicative of a second configuration utilized for mobile network related charging.

According to an exemplary aspect of the present invention, there is provided an apparatus of a charging entity of a second mobile network in a roaming charging related scenario between a first mobile network and said second mobile network, the apparatus comprising receiving circuitry configured to receive, from a session management entity of said second mobile network, a charging initiation request message, said charging initiation request message including information indicative of a first configuration utilized for mobile network related charging for generation of partial charging data records in said second mobile network, and transmitting circuitry configured to transmit, to said session management entity of said second mobile network, a charging initiation response message, said charging initiation response message being indicative of success of said generation of said partial charging data records in said second mobile network and including information indicative of said second configuration utilized for mobile network related charging.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient determination and exchanged of information relevant for charging coordination to thereby solve at least part of the problems and drawbacks identified in relation to the prior art.

By way of exemplary embodiments of the present invention, there is provided coordinated session charging in roaming scenarios. More specifically, by way of exemplary embodiments of the present invention, there are provided measures and mechanisms for realizing coordinated session charging in roaming scenarios. The provided measures and mechanisms for realizing coordinated charging in roaming scenarios may include measures and mechanisms for realizing synchronization and/or mirroring of charging in roaming scenarios.

Thus, improvement is achieved by methods, apparatuses and computer program products enabling/realizing coordinated session charging in roaming scenarios.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications (in particular in relation to 5G) being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) coordinated session charging in roaming scenarios.

Figure 1:
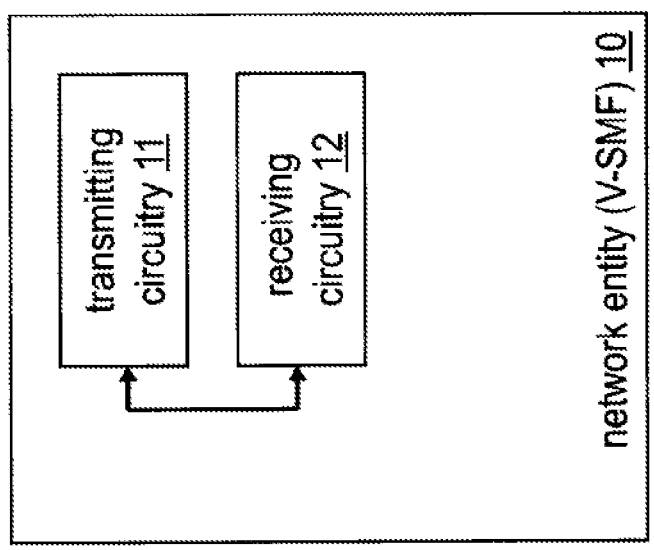
FIG. 1 is a block diagram illustrating an apparatus according to exemplary embodiments of the present invention.
Figure 8:
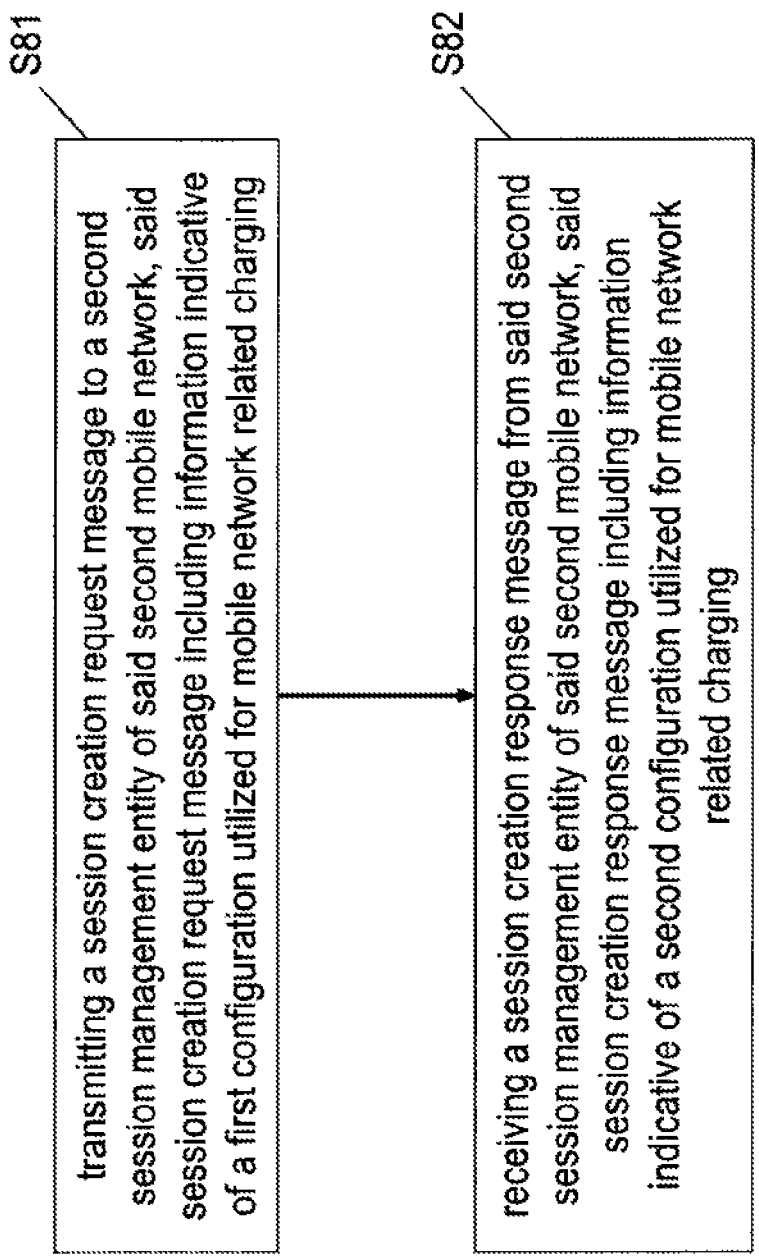
FIG. 8 is a schematic diagram of a procedure according to exemplary embodiments of the present invention.

FIG. 1 is a block diagram illustrating an apparatus according to exemplary embodiments of the present invention. The apparatus may be an network entity 10 (of a first session management entity of a first mobile network in a roaming charging related scenario between said first mobile network and a second mobile network)—such as a V-SMF—comprising a transmitting circuitry 11 and a receiving circuitry 12. The transmitting circuitry 11 transmits a session creation request message to a second session management entity of said second mobile network, said session creation request message including information indicative of a first configuration utilized for mobile network related charging. The receiving circuitry 12 receives a session creation response message from said second session management entity of said second mobile network, said session creation response message including information indicative of a second configuration utilized for mobile network related charging. FIG. 8 is a schematic diagram of a procedure according to exemplary embodiments of the present invention. The apparatus according to FIG. 1 may perform the method of FIG. 8 but is not limited to this method. The method of FIG. 8 may be performed by the apparatus of FIG. 1 but is not limited to being performed by this apparatus.

Figure 6:
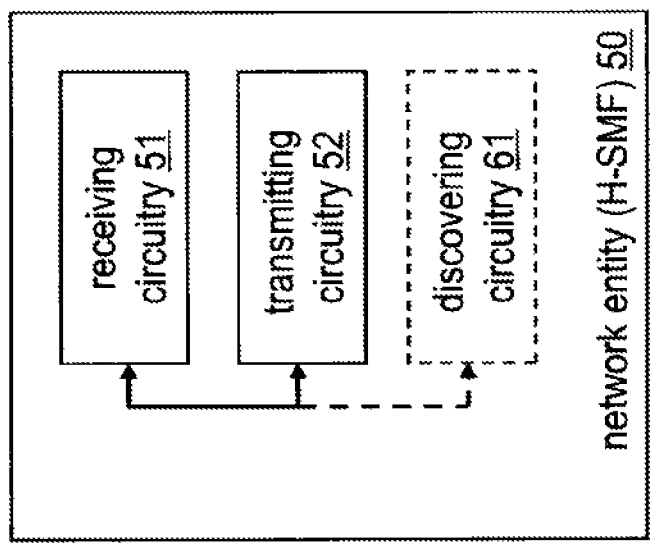
FIG. 6 is a block diagram illustrating an apparatus according to exemplary embodiments of the present invention.
Figure 13:
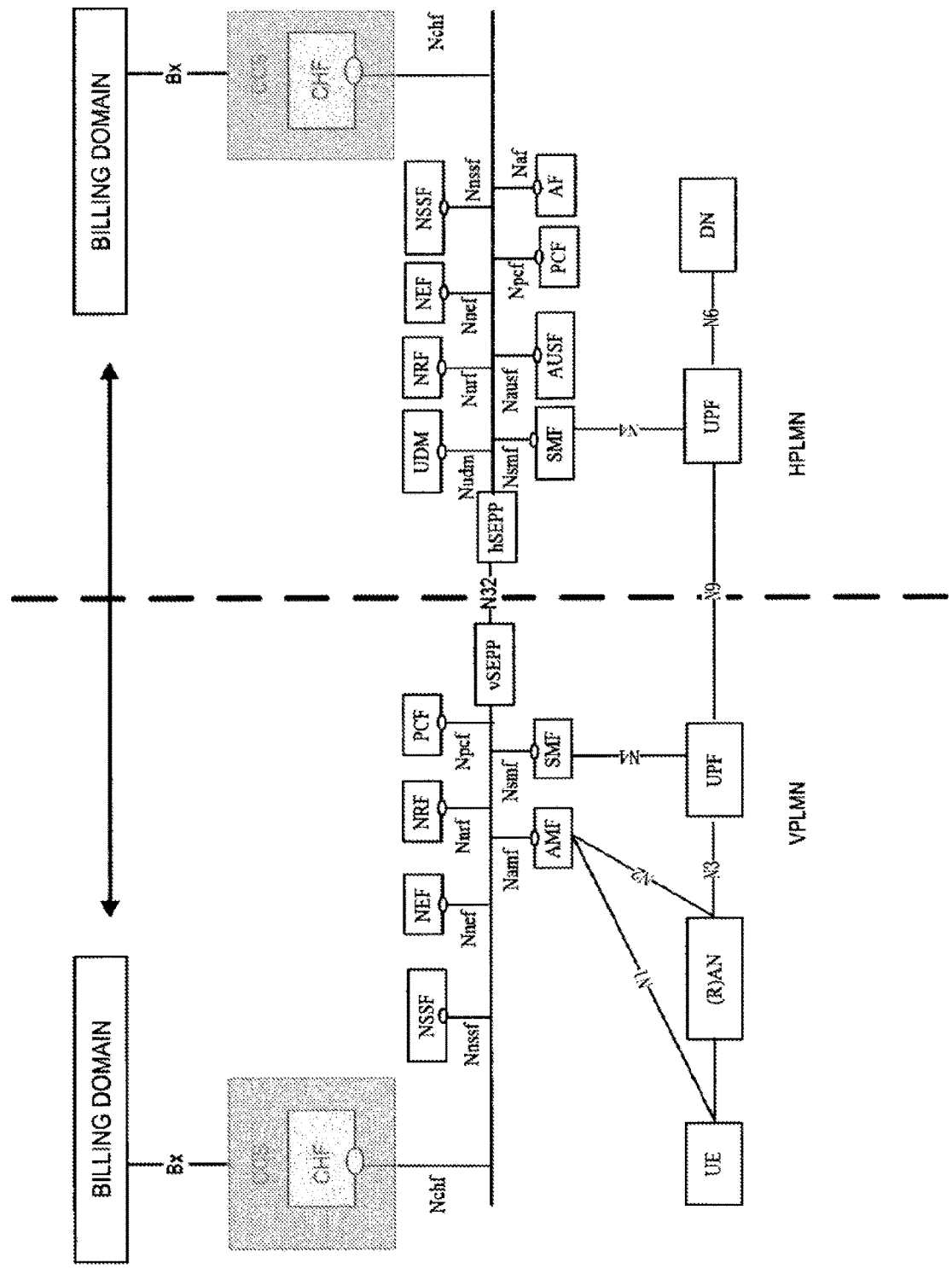
FIG. 13 shows a schematic diagram of an example of a system environment according to exemplary embodiments of the present invention.
Figure 14A:
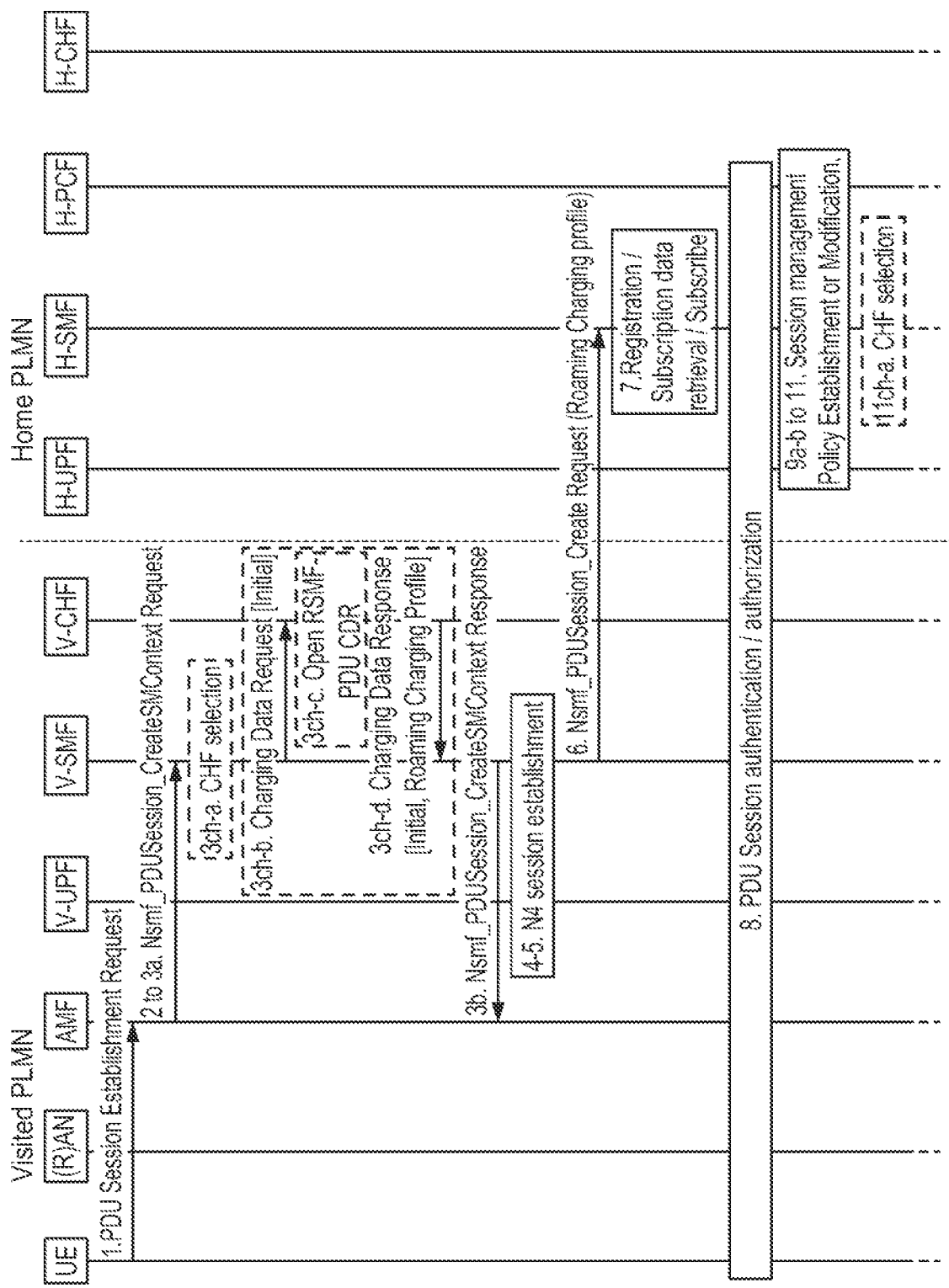
FIGS. 14A-14C show a schematic diagram of an example of a system environment with signaling variants according to exemplary embodiments of the present invention.
Figure 14B:
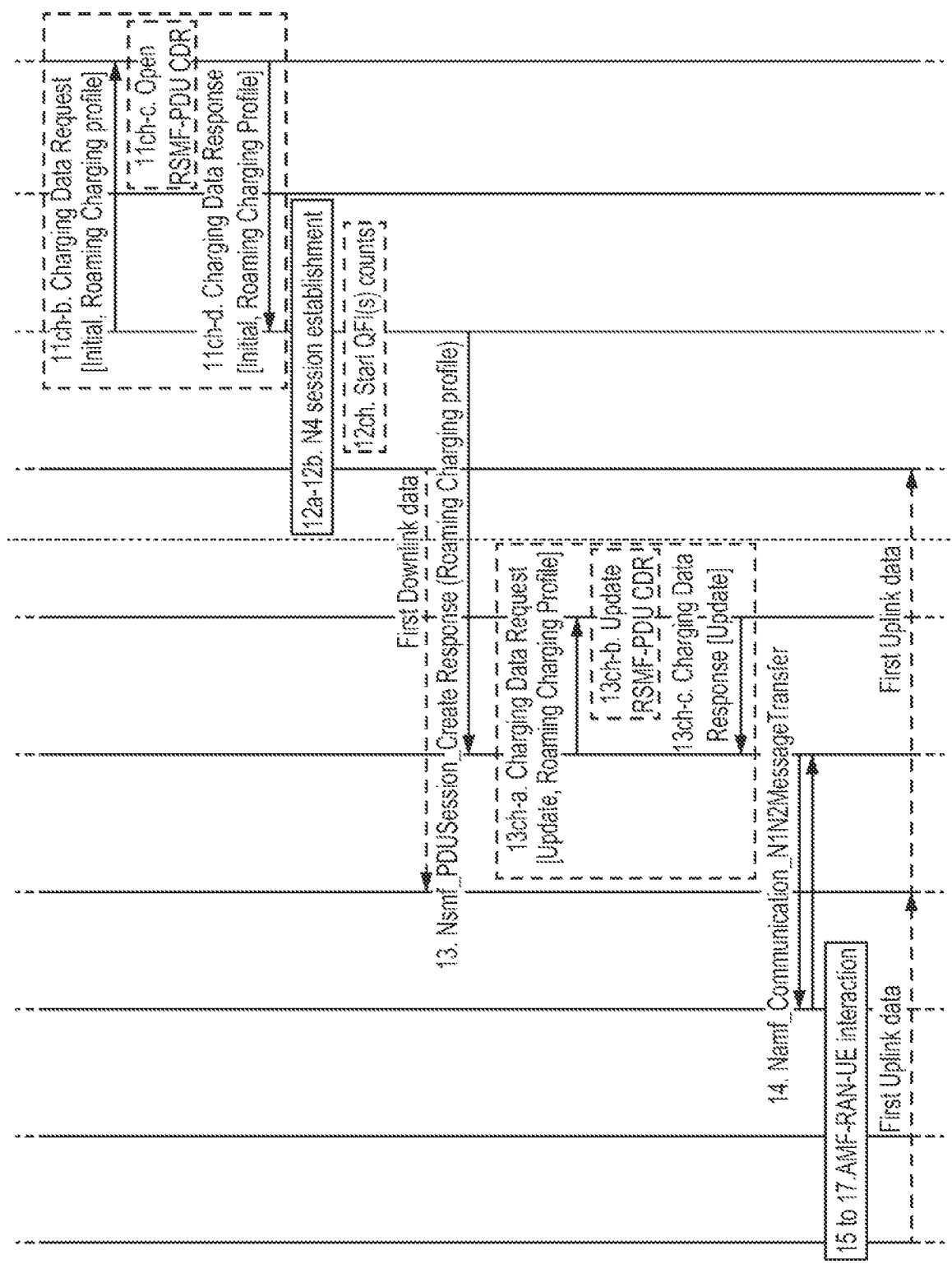
Figure 14C:
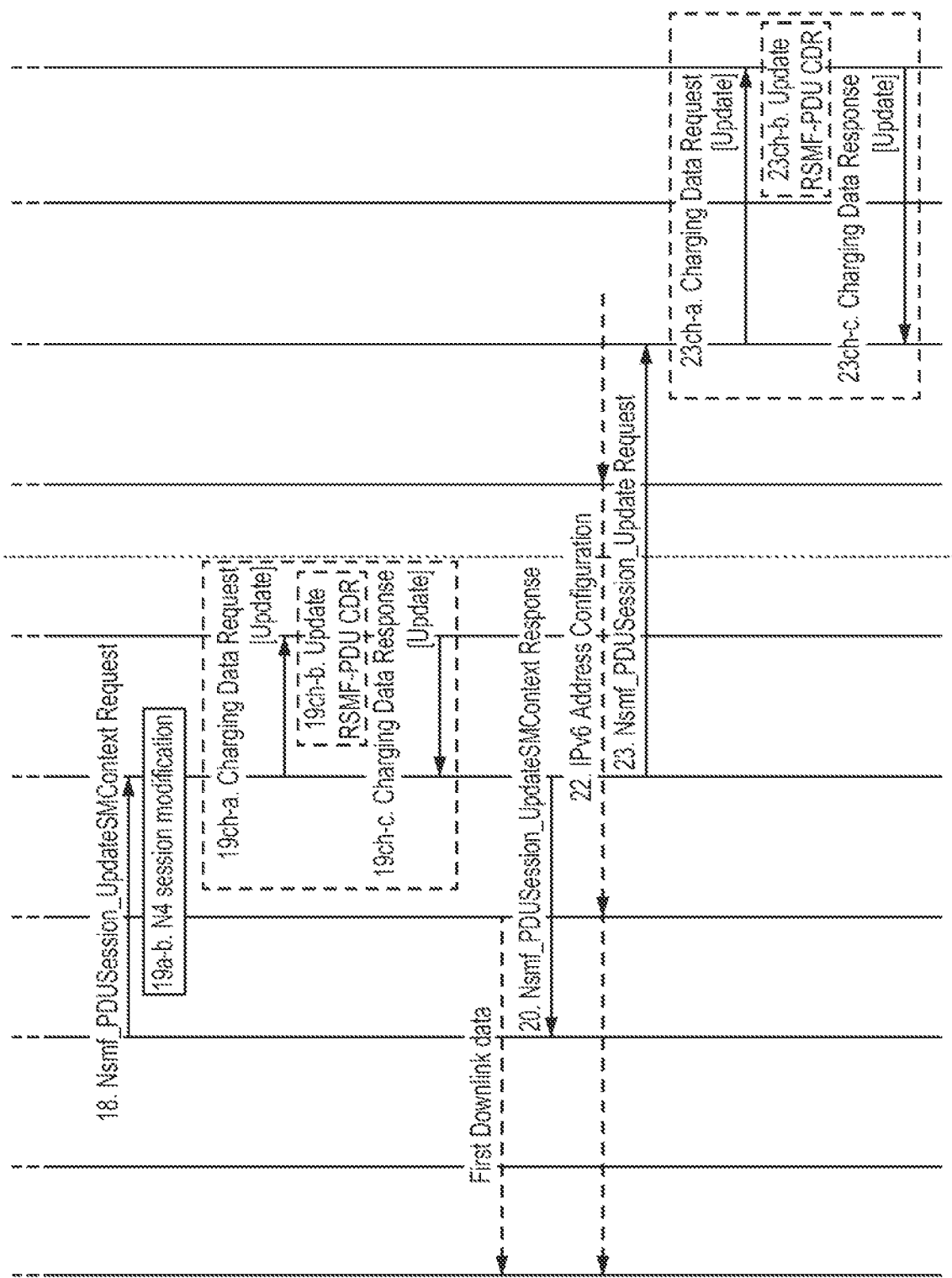
Figure 15:
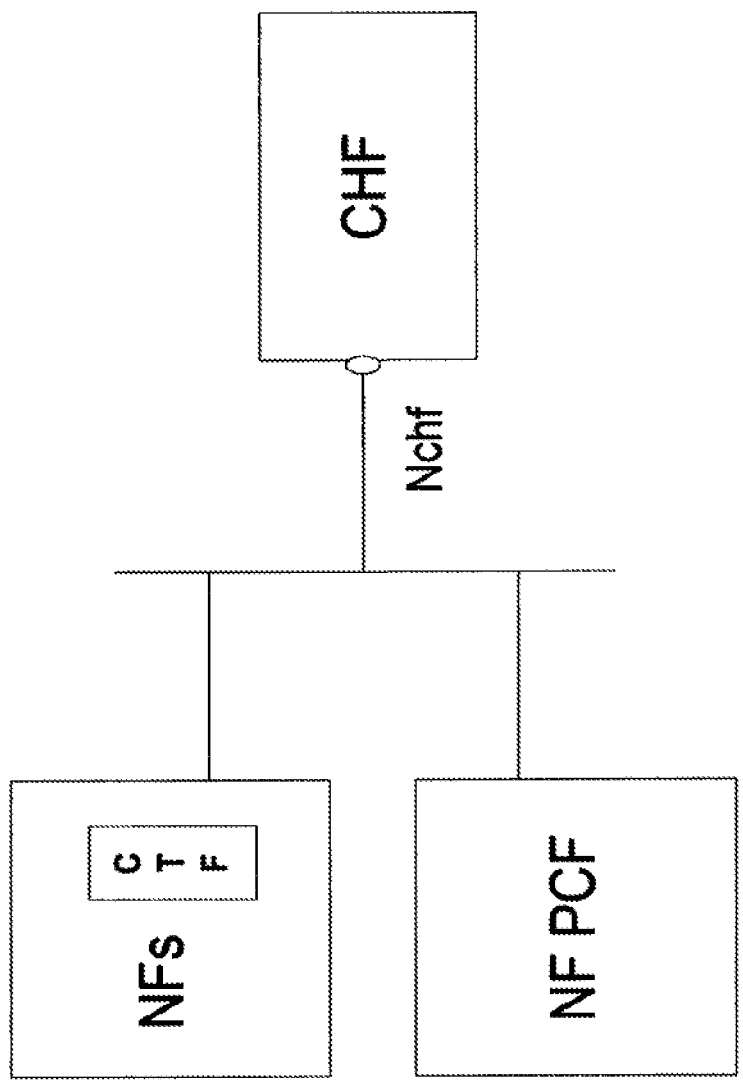
FIG. 15 shows a schematic diagram of an example of a CHF in an environment providing a framework including further NFs and an NF PCF.

As shown in FIG. 8, a procedure according to exemplary embodiments of the present invention comprises an operation of transmitting (S81; FIGS. 14-6) a session creation request message to a second session management entity of said second mobile network, said session creation request message including information indicative of a first configuration utilized for mobile network related charging, and an operation of receiving (S82; FIGS. 14-13) a session creation response message from said second session management entity of said second mobile network, said session creation response message including information indicative of a second configuration utilized for mobile network related charging.

Figure 2:
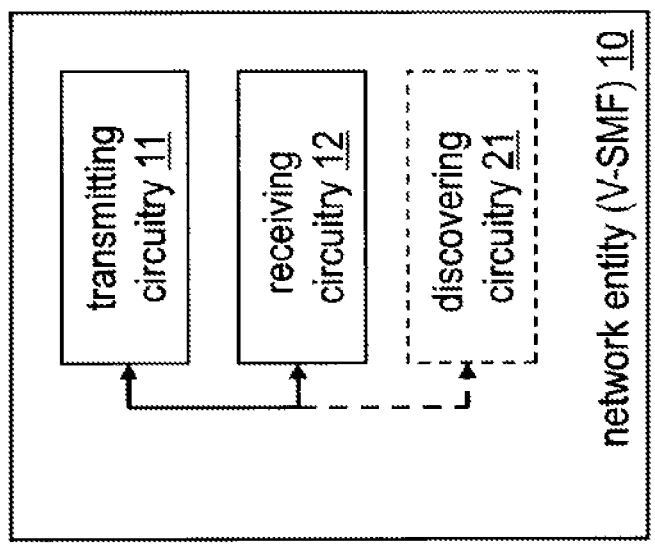
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a discovering circuitry 21.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

The first and the second configuration utilized for mobile network related charging may comprise information utilized for generation of charging events and information utilized for generation of partial charging data records in a mobile network.

According to a variation of the procedure shown in FIG. 8, exemplary additional operations are given, which are inherently independent from each other as such. According to such variation, an exemplary method according to exemplary embodiments of the present invention may comprise an operation of transmitting (FIGS. 14-13*ch-a*) a charging update request message to a charging entity of said first mobile network for updating a generation of partial charging data records in said first mobile network, said charging update request message including information indicative of said second configuration utilized for mobile network related charging.

According to a variation of the procedure shown in FIG. 8, exemplary additional operations are given, which are inherently independent from each other as such. According to such variation, an exemplary method according to exemplary embodiments of the present invention may comprise an operation of receiving (FIGS. 14-13*ch-c*) a charging update response message from said charging entity of said first mobile network, said charging update response message being indicative of success of said updating of said generation of said partial charging data records in said first mobile network.

According to a variation of the procedure shown in FIG. 8, exemplary additional operations are given, which are inherently independent from each other as such. According to such variation, an exemplary method according to exemplary embodiments of the present invention may comprise an operation of transmitting (FIGS. 14-3*ch-b*) a charging initiation request message to a charging entity of said first mobile network for generation of partial charging data records in said first mobile network, and an operation of receiving (FIGS. 14-3*ch-d*) a charging initiation response message from said charging entity of said first mobile network, said charging initiation response message being indicative of success of said generation of said partial charging data records in said first mobile network and including information indicative of said first configuration utilized for mobile network related charging.

According to a variation of the procedure shown in FIG. 8, exemplary additional operations are given, which are inherently independent from each other as such. According to such variation, an exemplary method according to exemplary embodiments of the present invention may comprise an operation of receiving (FIGS. 14-2 to 3*a*) a session establishment request indication message, and an operation of discovering (FIGS. 14-3*ch-a*) said charging entity of said first mobile network.

According to a variation of the procedure shown in FIG. 8, exemplary details of the discovering operation are given, which are inherently independent from each other as such. Such exemplary discovering operation according to exemplary embodiments of the present invention may comprise an operation of transmitting (FIGS. 17-1), to a repository entity of said first mobile network, a discovery request message indicative of a predetermined charging functionality, and an operation of receiving (FIGS. 17-3), from said repository entity of said first mobile network, a discovery response message indicative of said charging entity of said first mobile network, said charging entity of said first mobile network providing said predetermined charging functionality.

According to further exemplary embodiments of the present invention, said first session management entity is a visited session management function. According to still further exemplary embodiments of the present invention, said second session management entity is a home session management function.

According to still further exemplary embodiments of the present invention, said first mobile network is a visited public land mobile network. According to still further exemplary embodiments of the present invention, said second mobile network is a home public land mobile network.

According to still further exemplary embodiments of the present invention, said charging entity is a visited charging function.

According to still further exemplary embodiments of the present invention, said first configuration is a roaming charging profile. According to still further exemplary embodiments of the present invention, said second configuration is a roaming charging profile.

According to still further exemplary embodiments of the present invention, said partial charging data record is a partial roaming session management function protocol data unit charging data record.

According to still further exemplary embodiments of the present invention, said repository entity is a network function repository function.

According to still further exemplary embodiments of the present invention, said predetermined charging functionality is a roaming quality of service flow based charging functionality (roaming quality of service flow based charging, Roaming QoS flow Based Charging, Roaming QBC).

Figure 3:
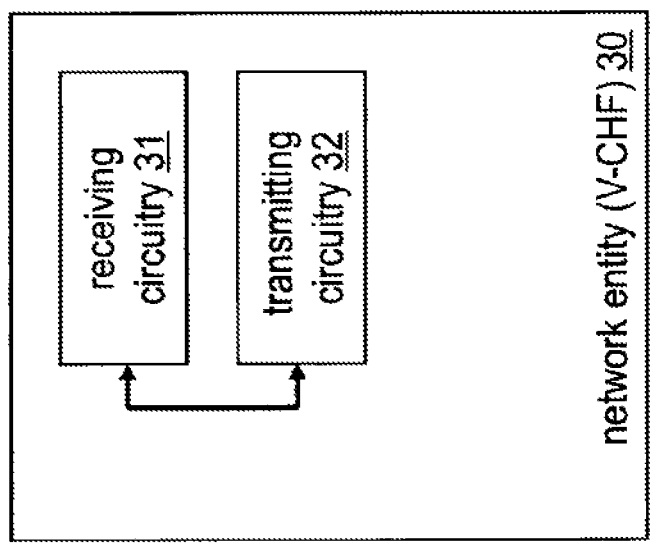
FIG. 3 is a block diagram illustrating an apparatus according to exemplary embodiments of the present invention.
Figure 9:
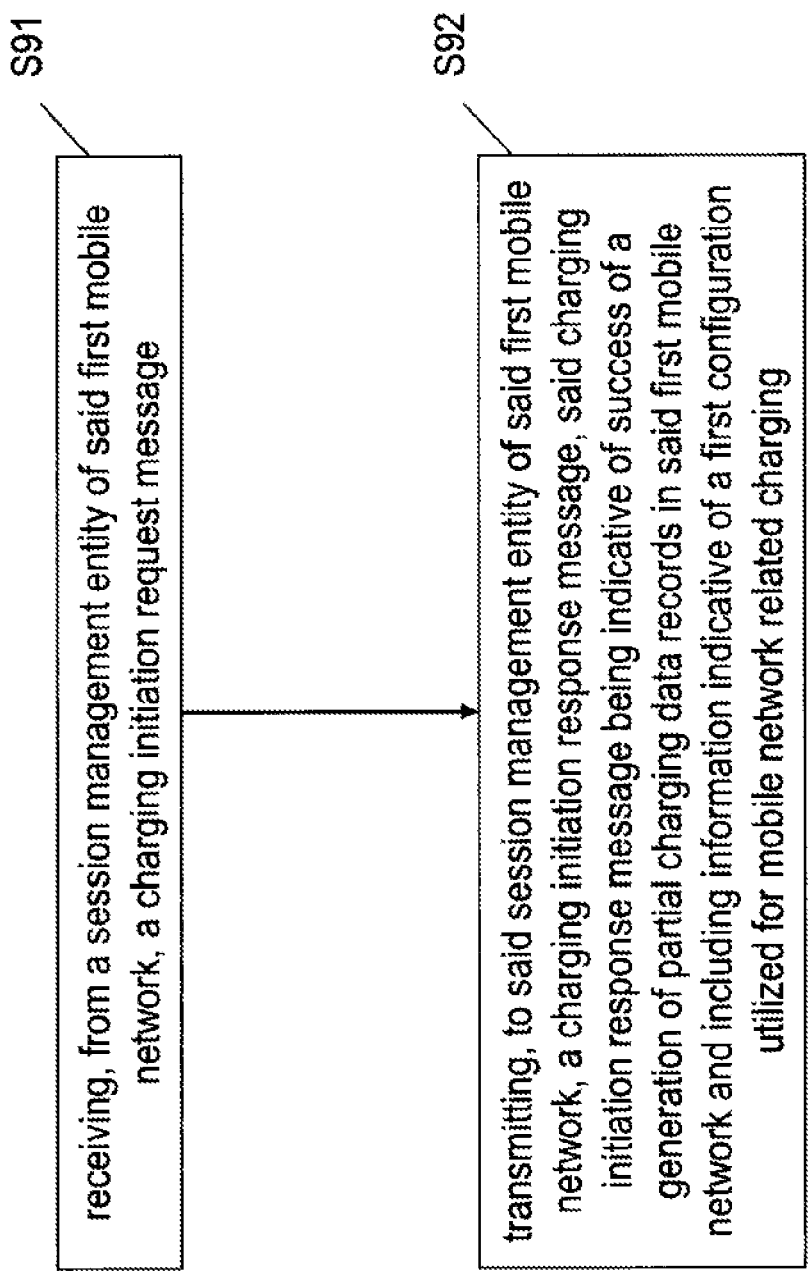
FIG. 9 is a schematic diagram of a procedure according to exemplary embodiments of the present invention.

FIG. 3 is a block diagram illustrating an apparatus according to exemplary embodiments of the present invention. The apparatus may be an network entity 30 (of a charging entity of a first mobile network in a roaming charging related scenario between said first mobile network and a second mobile network)—such as a V-CHF—comprising a receiving circuitry 31 and a transmitting circuitry 32. The receiving circuitry 31 receives, from a session management entity of said first mobile network, a charging initiation request message. The transmitting circuitry 32 transmits, to said session management entity of said first mobile network, a charging initiation response message, said charging initiation response message being indicative of success of a generation of partial charging data records in said first mobile network and including information indicative of a first configuration utilized for mobile network related charging. FIG. 9 is a schematic diagram of a procedure according to exemplary embodiments of the present invention. The apparatus according to FIG. 3 may perform the method of FIG. 9 but is not limited to this method. The method of FIG. 9 may be performed by the apparatus of FIG. 3 but is not limited to being performed by this apparatus.

As shown in FIG. 9, a procedure according to exemplary embodiments of the present invention comprises an operation of receiving (S91; FIGS. 14-3ch-b), from a session management entity of said first mobile network, a charging initiation request message, and an operation of transmitting (S92; FIGS. 14-3ch-d), to said session management entity of said first mobile network, a charging initiation response message, said charging initiation response message being indicative of success of a generation of partial charging data records in said first mobile network and including information indicative of a first configuration utilized for mobile network related charging.

Figure 4:
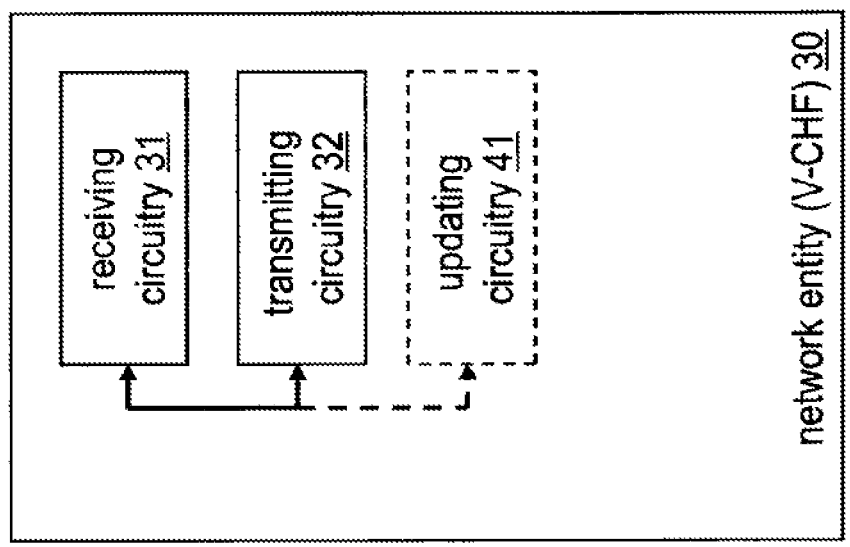
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise an updating circuitry 41.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 9, exemplary additional operations are given, which are inherently independent from each other as such. According to such variation, an exemplary method according to exemplary embodiments of the present invention may comprise an operation of receiving (FIGS. 14-13ch-a), from said session management entity of said first mobile network, a charging update request message, said charging update request message including information indicative of a second configuration utilized for mobile network related charging.

According to a variation of the procedure shown in FIG. 9, exemplary additional operations are given, which are inherently independent from each other as such. According to such variation, an exemplary method according to exemplary embodiments of the present invention may comprise an operation of updating (FIGS. 14-13ch-b) said generation of said partial charging data records in said first mobile network based on said second configuration utilized for mobile network related charging, and an operation of transmitting (FIGS. 14-13ch-c), to said session management entity of said first mobile network, a charging update response message, said charging update response message being indicative of success of said updating said generation of said partial charging data records in said first mobile network.

According to further exemplary embodiments of the present invention, said session management entity is a visited session management function.

According to still further exemplary embodiments of the present invention, said first mobile network is a visited public land mobile network. According to still further exemplary embodiments of the present invention, said second mobile network is a home public land mobile network.

According to still further exemplary embodiments of the present invention, said charging entity is a visited charging function.

According to still further exemplary embodiments of the present invention, said first configuration is a roaming charging profile. According to still further exemplary embodiments of the present invention, said second configuration is a roaming charging profile.

According to still further exemplary embodiments of the present invention, said partial charging data record is a partial roaming session management function protocol data unit charging data record.

Figure 5:
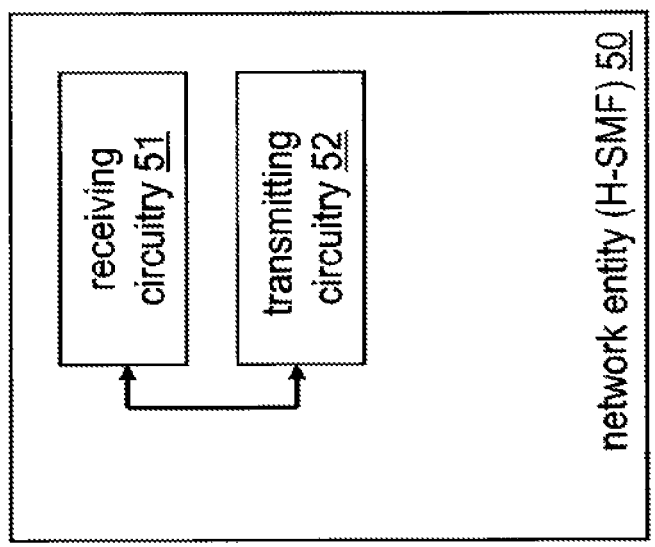
FIG. 5 is a block diagram illustrating an apparatus according to exemplary embodiments of the present invention.
Figure 10:
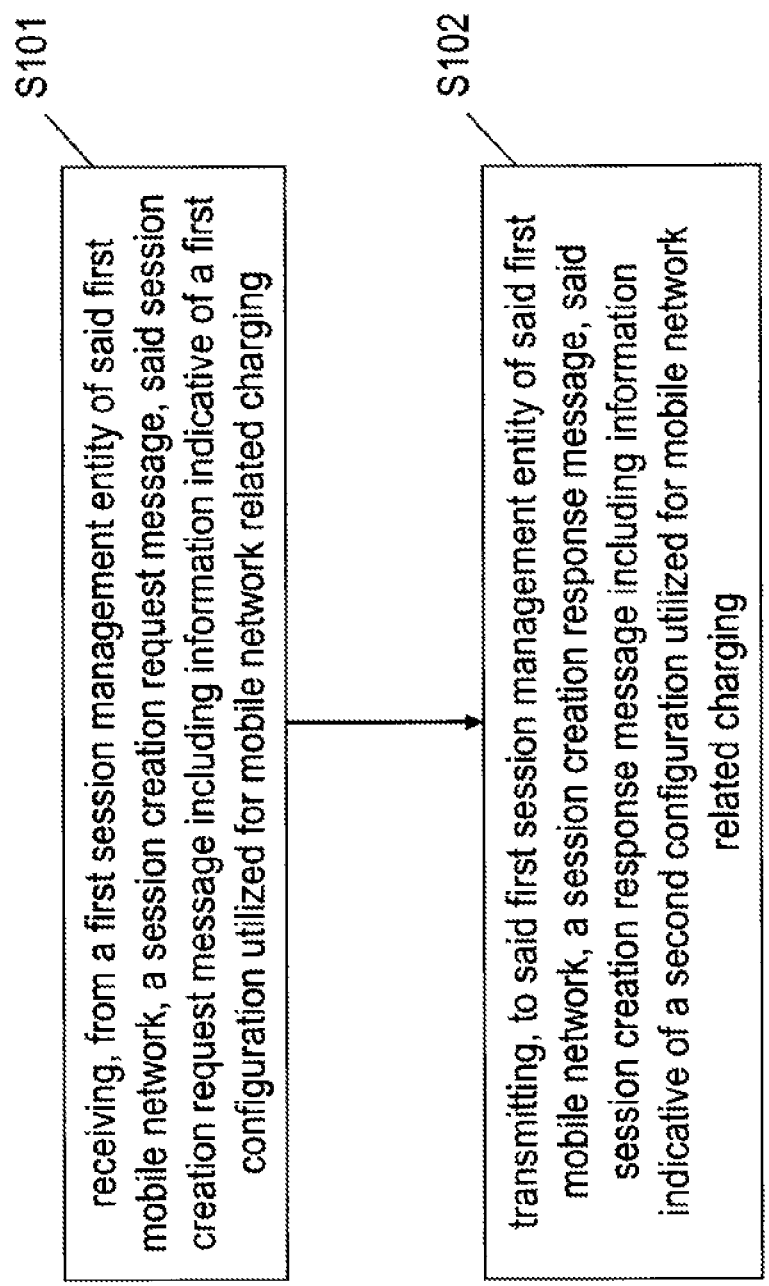
FIG. 10 is a schematic diagram of a procedure according to exemplary embodiments of the present invention.

FIG. 5 is a block diagram illustrating an apparatus according to exemplary embodiments of the present invention. The apparatus may be an network entity 50 (of a second session management entity of a second mobile network in a roaming charging related scenario between a first mobile network and said second mobile network)—such as a H-SMF—comprising a receiving circuitry 51 and a transmitting circuitry 52. The receiving circuitry 51 receives, from a first session management entity of said first mobile network, a session creation request message, said session creation request message including information indicative of a first configuration utilized for mobile network related charging. The transmitting circuitry 52 transmits, to said first session management entity of said first mobile network, a session creation response message, said session creation response message including information indicative of a second configuration utilized for mobile network related charging. FIG. 10 is a schematic diagram of a procedure according to exemplary embodiments of the present invention. The apparatus according to FIG. 5 may perform the method of FIG. 10 but is not limited to this method. The method of FIG. 10 may be performed by the apparatus of FIG. 5 but is not limited to being performed by this apparatus.

As shown in FIG. 10, a procedure according to exemplary embodiments of the present invention comprises an operation of receiving (S101), from a first session management entity of said first mobile network, a session creation request message, said session creation request message including information indicative of a first configuration utilized for mobile network related charging, and an operation of transmitting (S102), to said first session management entity of said first mobile network, a session creation response message, said session creation response message including information indicative of a second configuration utilized for mobile network related charging.

FIG. 6 is a block diagram illustrating an apparatus according to exemplary embodiments of the present invention. In particular, FIG. 6 illustrates a variation of the apparatus shown in FIG. 5. The apparatus according to FIG. 6 may thus further comprise a discovering circuitry 61.

In an embodiment at least some of the functionalities of the apparatus shown in FIG. 5 (or 6) may be shared between two physically separate devices forming one operational entity. Therefore, the apparatus may be seen to depict the operational entity comprising one or more physically separate devices for executing at least some of the described processes.

According to a variation of the procedure shown in FIG. 10, exemplary additional operations are given, which are inherently independent from each other as such. According to such variation, an exemplary method according to exemplary embodiments of the present invention may comprise an operation of transmitting (FIGS. 14-11ch-b) a charging initiation request message to a charging entity of said second mobile network, said charging initiation request message including information indicative of a first configuration utilized for mobile network related charging for generation of partial charging data records in said second mobile network, and an operation of receiving (FIGS. 14-11ch-d) a charging initiation response message from said charging entity of said second mobile network, said charging initiation response message being indicative of success of said generation of said partial charging data records in said second mobile network and including information indicative of a second configuration utilized for mobile network related charging.

According to a variation of the procedure shown in FIG. 10, exemplary additional operations are given, which are inherently independent from each other as such. According to such variation, an exemplary method according to exemplary embodiments of the present invention may comprise an operation of discovering (FIGS. 14-11ch-a) said charging entity of said second mobile network.

According to a variation of the procedure shown in FIG. 10, exemplary details of the discovering operation are given, which are inherently independent from each other as such. Such exemplary discovering operation according to exemplary embodiments of the present invention may comprise an operation of transmitting (FIGS. 17-1), to a repository entity of said second mobile network, a discovery request message indicative of a predetermined charging functionality, and an operation of receiving (FIGS. 17-3), from said repository entity of said second mobile network, a discovery response message indicative of said charging entity of said second mobile network, said charging entity of said second mobile network providing said predetermined charging functionality.

According to further exemplary embodiments of the present invention, said first session management entity is a visited session management function. According to still further exemplary embodiments of the present invention, said second session management entity is a home session management function.

According to still further exemplary embodiments of the present invention, said first mobile network is a visited public land mobile network. According to still further exemplary embodiments of the present invention, said second mobile network is a home public land mobile network.

According to still further exemplary embodiments of the present invention, said charging entity is a home charging function.

According to still further exemplary embodiments of the present invention, said first configuration is a roaming charging profile. According to still further exemplary embodiments of the present invention, said second configuration is a roaming charging profile.

According to still further exemplary embodiments of the present invention, said partial charging data record is a partial roaming session management function protocol data unit charging data record.

According to still further exemplary embodiments of the present invention, said repository entity is a network function repository function.

According to still further exemplary embodiments of the present invention, said predetermined charging functionality is a roaming quality of service flow based charging functionality.

Figure 7:
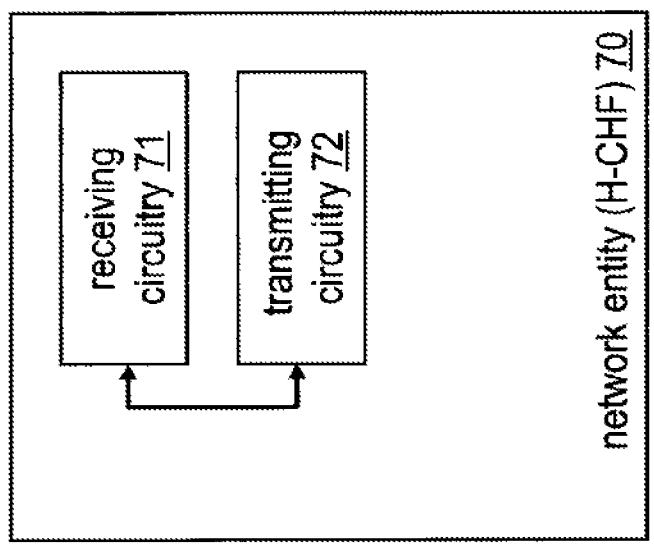
FIG. 7 is a block diagram illustrating an apparatus according to exemplary embodiments of the present invention.
Figure 11:
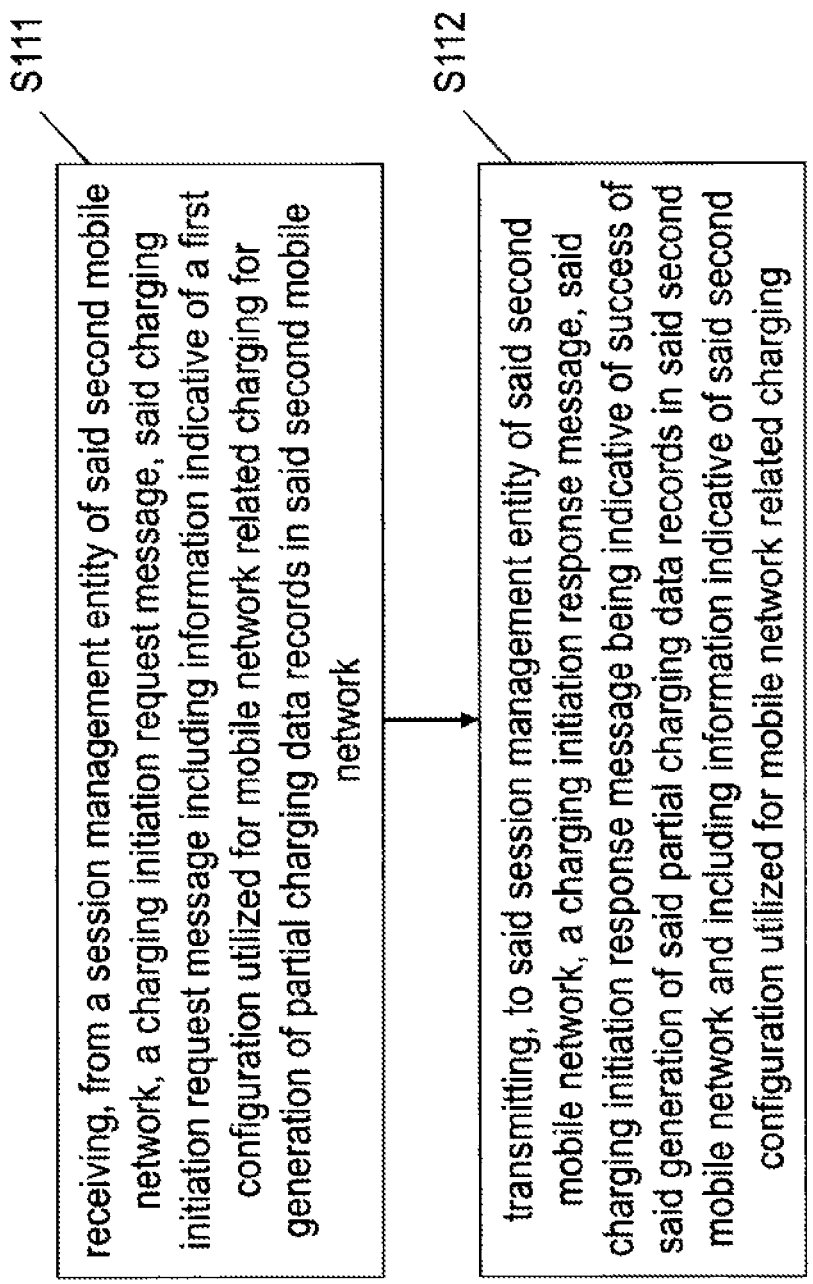
FIG. 11 is a schematic diagram of a procedure according to exemplary embodiments of the present invention.

FIG. 7 is a block diagram illustrating an apparatus according to exemplary embodiments of the present invention. The apparatus may be an network entity 70 (of a charging entity of a second mobile network in a roaming charging related scenario between a first mobile network and said second mobile network)—such as a H-CHF—comprising a receiving circuitry 71 and a transmitting circuitry 72. The receiving circuitry 71 receives, from a session management entity of said second mobile network, a charging initiation request message, said charging initiation request message including information indicative of a first configuration utilized for mobile network related charging for generation of partial charging data records in said second mobile network. The transmitting circuitry 72 transmits, to said session management entity of said second mobile network, a charging initiation response message, said charging initiation response message being indicative of success of said generation of said partial charging data records in said second mobile network and including information indicative of said second configuration utilized for mobile network related charging. FIG. 11 is a schematic diagram of a procedure according to exemplary embodiments of the present invention. The apparatus according to FIG. 7 may perform the method of FIG. 11 but is not limited to this method. The method of FIG. 11 may be performed by the apparatus of FIG. 7 but is not limited to being performed by this apparatus.

As shown in FIG. 11, a procedure according to exemplary embodiments of the present invention comprises an operation of receiving (S111; FIGS. 14-11ch-b), from a session management entity of said second mobile network, a charging initiation request message, said charging initiation request message including information indicative of a first configuration utilized for mobile network related charging for generation of partial charging data records in said second mobile network, and an operation of transmitting (S111; FIGS. 14-11ch-d), to said session management entity of said second mobile network, a charging initiation response message, said charging initiation response message being indicative of success of said generation of said partial charging data records in said second mobile network and including information indicative of said second configuration utilized for mobile network related charging.

In an embodiment at least some of the functionalities of the apparatus shown in FIG. 7 may be shared between two physically separate devices forming one operational entity. Therefore, the apparatus may be seen to depict the operational entity comprising one or more physically separate devices for executing at least some of the described processes.

According to further exemplary embodiments of the present invention, said session management entity is a home session management function.

According to still further exemplary embodiments of the present invention, said first mobile network is a visited public land mobile network. According to still further exemplary embodiments of the present invention, said second mobile network is a home public land mobile network.

According to still further exemplary embodiments of the present invention, said charging entity is a home charging function.

According to still further exemplary embodiments of the present invention, said first configuration is a roaming charging profile. According to still further exemplary embodiments of the present invention, said second configuration is a roaming charging profile.

According to still further exemplary embodiments of the present invention, said partial charging data record is a partial roaming session management function protocol data unit charging data record.

Figure 12:
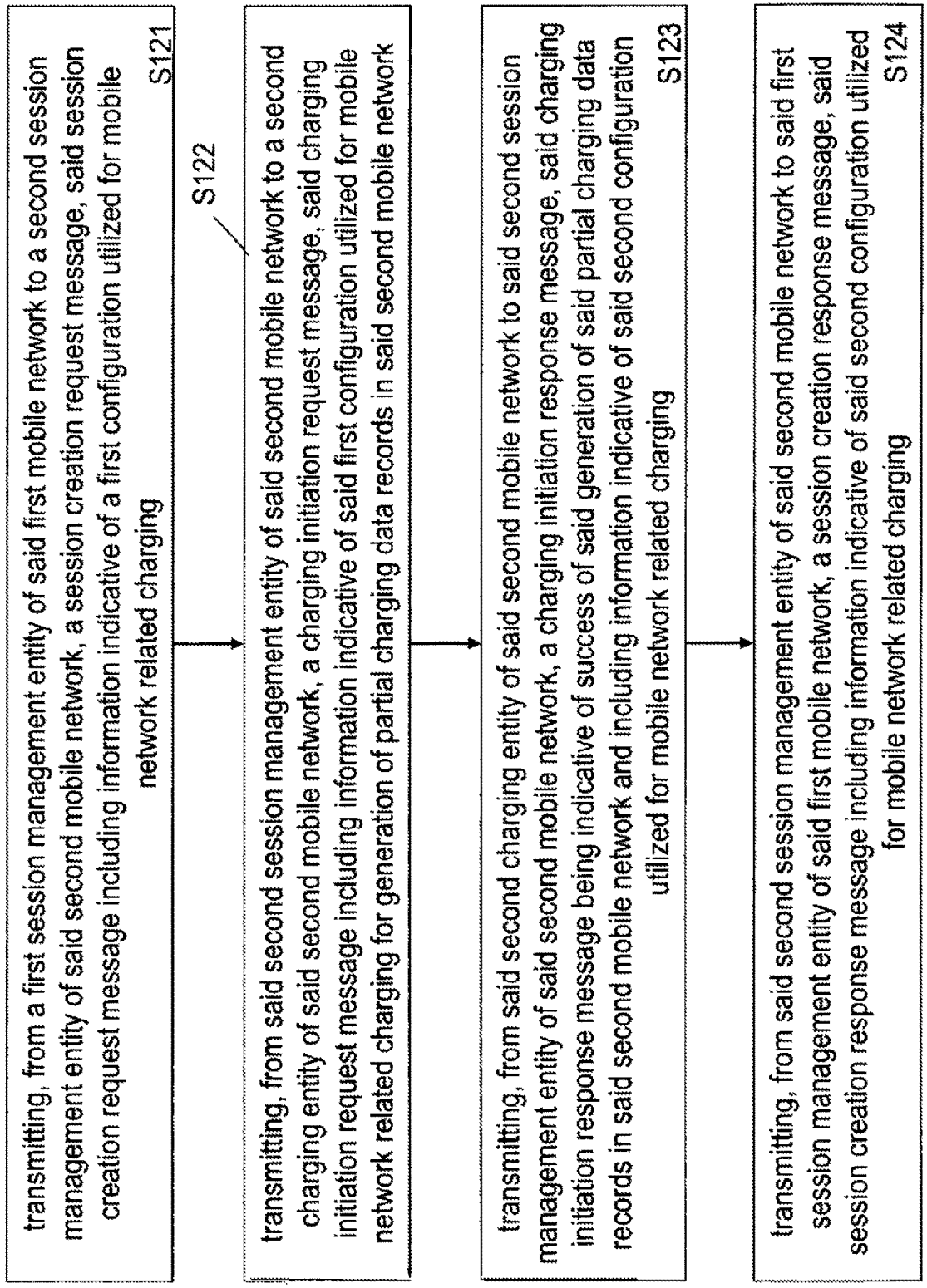
FIG. 12 is a schematic diagram of a procedure according to exemplary embodiments of the present invention.

FIG. 12 is a schematic diagram of a procedure according to exemplary embodiments of the present invention.

FIG. 12 illustrates certain steps already discussed above in relation to FIGS. 8 to 11.

In a system thus formed by considering these certain steps already discussed above in relation to FIGS. 8 to 11, as shown in FIG. 12, a procedure (in a roaming charging related scenario between a first mobile network and a second mobile network) according to exemplary embodiments of the present invention comprises an operation of transmitting (S121; FIGS. 14-6), from a first session management entity of said first mobile network to a second session management entity of said second mobile network, a session creation request message, said session creation request message including information indicative of a first configuration utilized for mobile network related charging, an operation of transmitting (S122; FIGS. 14-11ch-b), from said second session management entity of said second mobile network to a second charging entity of said second mobile network, a charging initiation request message, said charging initiation request message including information indicative of said first configuration utilized for mobile network related charging for generation of partial charging data records in said second mobile network, an operation of transmitting (S123; FIGS. 14-11ch-d), from said second charging entity of said second mobile network to said second session management entity of said second mobile network, a charging initiation response message, said charging initiation response message being indicative of success of said generation of said partial charging data records in said second mobile network and including information indicative of said second configuration utilized for mobile network related charging, and an operation of transmitting (S124; FIGS. 14-13), from said second session management entity of said second mobile network to said first session management entity of said first mobile network, a session creation response message, said session creation response message including information indicative of said second configuration utilized for mobile network related charging.

According to a variation of the procedure shown in FIG. 12, exemplary additional operations are given, which are inherently independent from each other as such. According to such variation, an exemplary method according to exemplary embodiments of the present invention may comprise an operation of transmitting (FIGS. 14-13ch-a), from said first session management entity of said first mobile network to a first charging entity of said first mobile network, a charging update request message, said charging update request message including information indicative of said second configuration utilized for mobile network related charging, and an operation of updating (FIGS. 14-13ch-b), at said first charging entity of said first mobile network, said generation of said partial charging data records in said first mobile network based on said second configuration utilized for mobile network related charging.

According to a variation of the procedure shown in FIG. 12, exemplary additional operations are given, which are inherently independent from each other as such. According to such variation, an exemplary method according to exemplary embodiments of the present invention may comprise an operation of transmitting (FIGS. 14-13ch-c), from said first charging entity of said first mobile network to said first session management entity of said first mobile network, a charging update response message, said charging update response message being indicative of success of said updating said generation of said partial charging data records in said first mobile network.

In other words, according to exemplary embodiments of the present invention, a common "Roaming SMF CDR" (e.g. RSMF-PDU-CDR) to be generated
  in V-PLMN for in-bound roamers, with an indication "in-bound roamer",
  in H-PLMN for out-bound roamers, with an indication "out-bound roamer",
is defined.

According to exemplary embodiments of the present invention, the triggers for closing containers and partial CDRs generation for this "Roaming SMF CDR" are common in V-PLMN and H-PLMN, and this is obtained from a negotiation between PLMNs on a per-PDU session basis, or configured in CHF on a per-roaming agreement between PLMNs.

It is to be noted that conventionally partial CDRs are generated in a CHF that may be aggregated to (complete) CDRs external to the CHF, for example in a billing domain. However, it may also be possible that (complete) CDRs are generated in the CHF.

A further aspect of the present invention explained in detail below, according to which the NRF framework is used for the CHF to register (the single ConvergedCharging service) with specific CHF profile(s), may be utilized in relation to the charging coordination to introduce a CHF profile for the specific e.g. "offline charging for roaming" or "QoS flow based charging" functionality of TS 32.255, or for "Roaming QoS flow based charging" ("Roaming QBC").

FIG. 13 shows a schematic diagram of an example of a system environment according to exemplary embodiments of the present invention.

In particular, FIG. 13 illustrates an overall architecture in relation to roaming management between a V-PLMN and a H-PLMN.

FIG. 14 shows a schematic diagram of an example of a system environment with signaling variants according to exemplary embodiments of the present invention, and details of exemplary embodiments of the present invention described in relation to FIGS. 1 to 12 above are explained in different terms.

In detail, according to these different more specific terms, FIG. 14 illustrates an establishment roaming in a home routed case in a PDU session charging scenario, in particular an end to end flow for "roaming charging profile".

The details given herein below may be introduced into 3GPP TS 23.502 and/or TS 32.255.

In steps 1-3a of FIG. 14, a UE initiates a new PDU session. V-SMF and H-SMF selection by the AMF are effected.

In step 3ch-a, the UE is identified as a roamer (PLMN ID of the received SUPI is different from VPLMN PLMN ID), and the CHF is selected accordingly.

In step 3ch-b, a Charging Id is generated for the PDU session. A Charging Data Request [Initial] is sent to CHF, indicating "in-bound roamer".

In step 3ch-c, the CHF opens a RSMF-PDU-CDR (indicating "in-bound roamer").

In step 3ch-d, the CHF acknowledges by sending Charging Data Response[Initial] to the SMF and optionally supplies a "Roaming Charging Profile" to the V-SMF which overrides the default one.

In step 3b-5, V-UPF selection by V-SMF, and N4 establishment are effected.

In step 6, an Nsmf_PDUSession_Create Request from V-SMF to H-SMF includes the "Roaming Charging Profile" applicable in VPLMN, and the Charging Id assigned to the PDU session. V-SMF ID is stored in the H-SMF.

In step 7, Subscription Data Retrieval is effected in UDM, based on (Subscriber Permanent ID, DNN, VPLMN): Default QoS profile. Subscription data includes the authorized PDU type(s), authorized SSC mode(s), default 5QI and ARP, subscribed Session-AMBR, and charging characteristics.

In step 8, an Optional Secondary authorization/authentication is effected.

In steps [9a-b to 11], if dynamic PCC is deployed, the H-SMF performs PCF selection and requests for PCC Rules. The H-SMF may be provided with authorized Session-AMBR and the authorized 5QI and ARP. H-SMF selects the H-UPF.

In step 11ch-a, based on UE is identified as roaming in a different PLMN, the CHF is selected accordingly.

In step 11ch-b, a Charging Data Request [Initial] is sent to CHF, indicating "out-bound roamer", with the "Roaming Charging Profile" received from the VPLMN.

In step 11ch-c, the CHF opens a RSMF-PDU-CDR (indicating "out-bound roamer").

In step 11ch-d, the CHF acknowledges by sending Charging Data Response[Initial] to the H-SMF and may optionally supply the HPLMN selected "Roaming Charging Profile" (either the same as the one received from VPLMN, either its own selected) to the H-SMF.

In step [12a-b], the SMF initiates an N4 Session Establishment procedure with the selected UPF.

In step 12ch, each QoS flow established as result from binding mechanism upon PCC Rules activation, is assigned with a "QoS Flow Charging Identifier". Counts per QFI are started.

In step 13, Nsmf_PDUSession_Create Response takes place from H-SMF to V-SMF with selected PDU Session Type, SSC mode, HPLMN selected "Roaming Charging Profile", H-CN Tunnel Info, QFI(s), "QoS Flow Charging Identifier(s)", QoS profile(s), Session-AMBR, indication if VPLMN authorized to offload traffic (insert UL CL or Branching Point)). H-SMF ID is stored by V-SMF.

In step 13ch-a, a Charging Data Request [Update] is sent to CHF with charging information received from H-SMF which includes the HPLMN selected "Roaming Charging Profile" and counts per QFI are started.

In step 13ch-b, the CHF updates the RSMF-PDU-CDR.

In step 13ch-c, the CHF acknowledges by sending Charging Data Response[Update] to the V-SMF.

In steps [14-17], an AMF-RAN-UE interaction is effected.

In step 18, Nsmf_PDUSession_UpdateSMContext Request from AMF to V-SMF is effected. The rejected QFI(s) associated QoS profiles are released by the SMF.

In step 19a-b, an N4 session modification takes place.

In step 19ch-a, counts per rejected QFI(s) are closed. A Charging Data Request [Update] is sent to CHF to report if needed.

In step 19ch-b, the CHF updates the RSMF-PDU CDR.

In step 19ch-c, the CHF acknowledges by sending Charging Data Response[Update] to the V-SMF.

In steps [20-22], a PDU session establishment continuation is effected.

In step 23, Nsmf_PDUSession_UpdateRequest from V-SMF to H-SMF is effected. The rejected QFI(s) are notified to H-SMF.

In step 23ch-a, counts per rejected QFI(s) are closed. A Charging Data Request [Update] is sent to CHF to report if needed.

In step 23ch-b, the CHF updates the RSMF-PDU-CDR.

Finally, in step 23ch-c, the CHF acknowledges by sending Charging Data Response[Update] to the H-SMF.

It is noted that prior to this scenario, a CHF has registered to the NRF with a CHF profile "roaming quality of service flow based charging" in each PLMN in line with the above announced further aspect of the present invention, as is explained below.

Later on, when common trigger occurs simultaneously in V-PLMN and H-PLMN, either partial "RSMF-PDU" are generated by the CHF, or counts per QFI are closed in a synchronized way.

The mentioned Roaming Charging Profile contains:
Information used by SMF:
  the triggers for closing containers,
  the triggers for the SMF to report the containers (send a charging event) to CHF
Information used by CHF:
  To generate partial RSMF-PDU-CDRs.

This means that this profile includes the list of triggers with their category (immediate/deferred) and thresholds values when applicable, and in which circumstances partial CDRs are generated.

In more detail, when QoS flow based charging (QBC) is used in a context of roaming, the "Roaming Charging Profile" is defined and includes:
- the set of chargeable events and associated category,
- the set of thresholds for chargeable events based on trigger thresholds, and
- an indication on whether the "Default partial record" or the "Individual partial record" mechanism is used by CHF.

A default "Roaming Charging Profile" is specified for the SMF and comprises:
- the set of chargeable events and associated category specified as the default,
- the default set of thresholds configured in the Charging Characteristics for QBC, and
- the "Default partial record" mechanism indicated as the one used by CHF.

In the V-PLMN, at PDU session establishment the default "Roaming Charging Profile" in the V-SMF may optionally be overridden by a new "Roaming Charging Profile" supplied by the CHF in the Charging Data Response [Initial] with:
- updated triggers enablement, category, and new thresholds, and
- the selected partial record mechanism ("Default partial record" or "Individual partial record").

This updated "Roaming Charging Profile" is transferred from the V-SMF to the H-SMF and may be acknowledged or replaced by the H-PLMN into the H-PLMN selected "Roaming Charging Profile" to be used by the V-SMF.

In the H-PLMN, at PDU session establishment, the "Roaming Charging Profile", when received by the H-SMF from the V-SMF, may be updated by the H-CHF in the Charging Data Response [Initial] to H-SMF.

This H-CHF selected "Roaming Charging Profile" is used by the H-SMF and transferred towards the V-PLMN.

The "Roaming Charging Profile" resulting from the exchange between the V-PLMN and H-PLMN at PDU session establishment shall remain unchanged during the PDU session lifetime.

A capability for the CHF to be able to update the triggers after the PDU session is established shall not be applicable.

Figure 16:
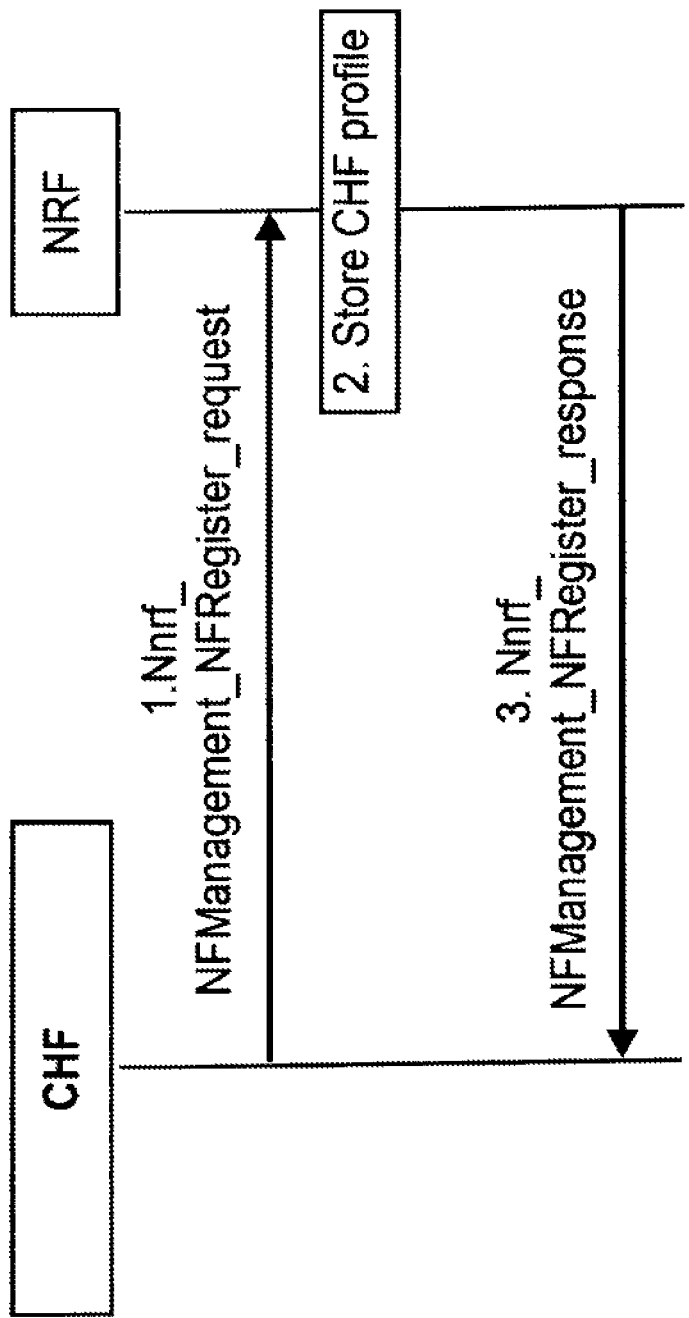
FIG. 16 shows a schematic diagram of an example of a system environment with signaling variants according to exemplary embodiments of the present invention.

FIG. 16 shows a schematic diagram of an example of a system environment with signaling variants according to exemplary embodiments of the present invention and in particular according to the above-mentioned further aspect of the present invention. FIG. 16 illustrates the use of the NRF by the CHF to register a particular "CHF profile", i.e., an Nnrf_NF Registration procedure.

In detail, according to exemplary embodiments of the present invention, for the use of the NRF framework by CHFs different CHF specific profiles are introduced, which are associated to:
- a domain specific charging TS (similar as service-context-Id, e.g. TS 32.255), and
- a specific functionality within a domain (e.g. PDU session flow based charging in TS 32.255) which can be served independently.

Thus, the CHF profile provided in the Nnrf_NFManagement_NFRegister_request is defined by:
- the service/domain specific document that applies to the request (e.g. TS 32.255), and
- the specific functionality within the service/domain document (e.g. Flow based charging).

Accordingly, in step 1 of FIG. 16, the CHF sends an Nnrf_NFManagement_NFRegister_request.

In step 2, a corresponding CHF profile is stored by the NRF.

In step 3, the NRF transmits an Nnrf_NFManagement_NFRegister_response back to the CHF.

Figure 17:
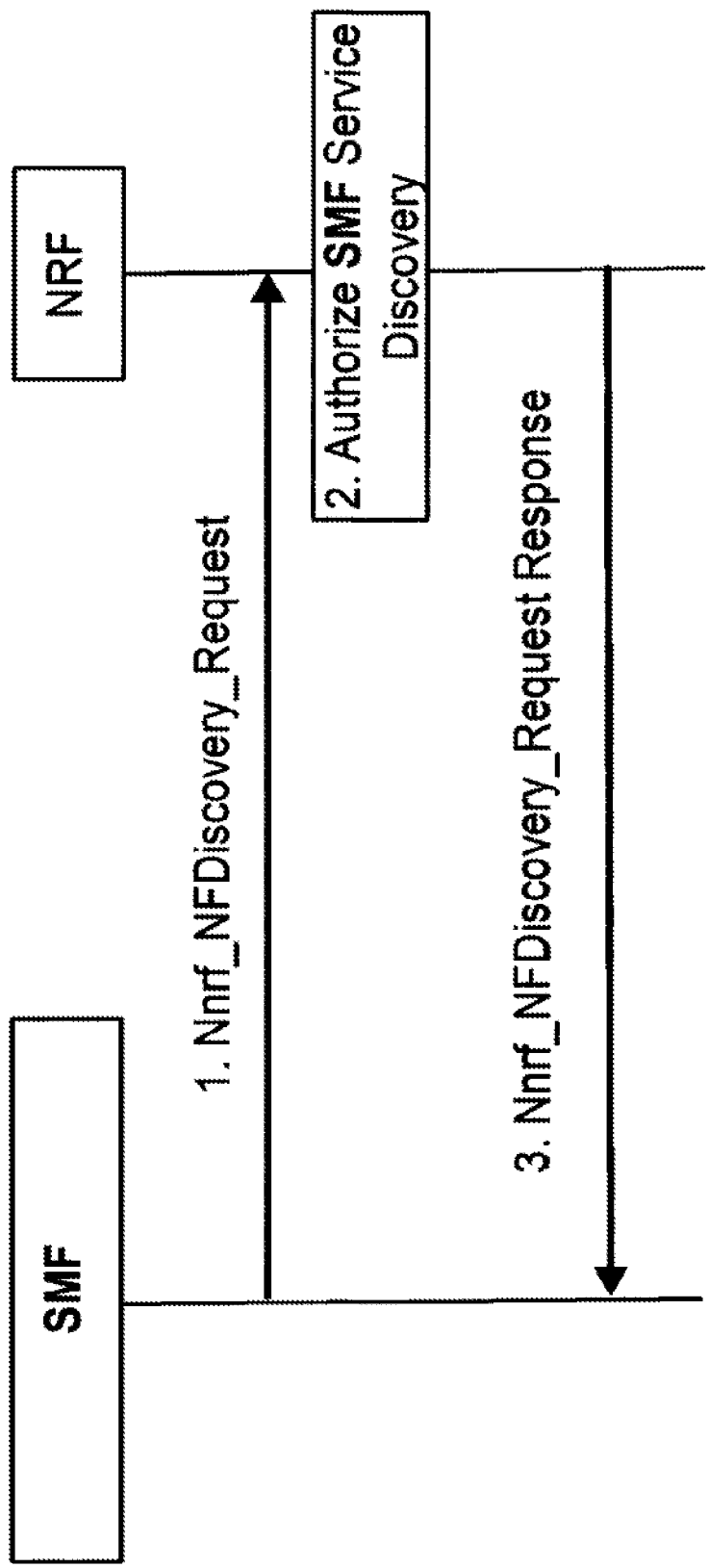
FIG. 17 shows a schematic diagram of an example of a system environment with signaling variants according to exemplary embodiments of the present invention.

FIG. 17 shows a schematic diagram of an example of a system environment with signaling variants according to exemplary embodiments of the present invention and in particular according to the above-mentioned further aspect of the present invention.

In particular, FIG. 17 illustrates the use of the NRF by the SMF to discover a CHF instance offering the Converged-Charging service, when "PDU session flow based charging" is required (NF/NF service discovery in the same PLMN).

In step 1 of FIG. 17, upon PDU session establishment, the SMF sends the Nnrf_NFDiscovery_Request to the NRF, indicating:
- the service invoked: ConvergedCharging service from CHF,
- the service/domain specific document that applies to the request (e.g. TS 32.255), and
- the specific functionality within the service/domain document (e.g. Flow based charging).

In step 2, based on the request comes from a SMF, the NRF allows to discover the expected NF instance(s). In case the request comes from a NF different from the SMF, the NRF does not allow the discovery.

In step 3, the NRF determines the discovered NF instance(s) or NF service instance(s), based on criteria matching the registered CHF profile(s) and provides the related information to the SMF.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 18:
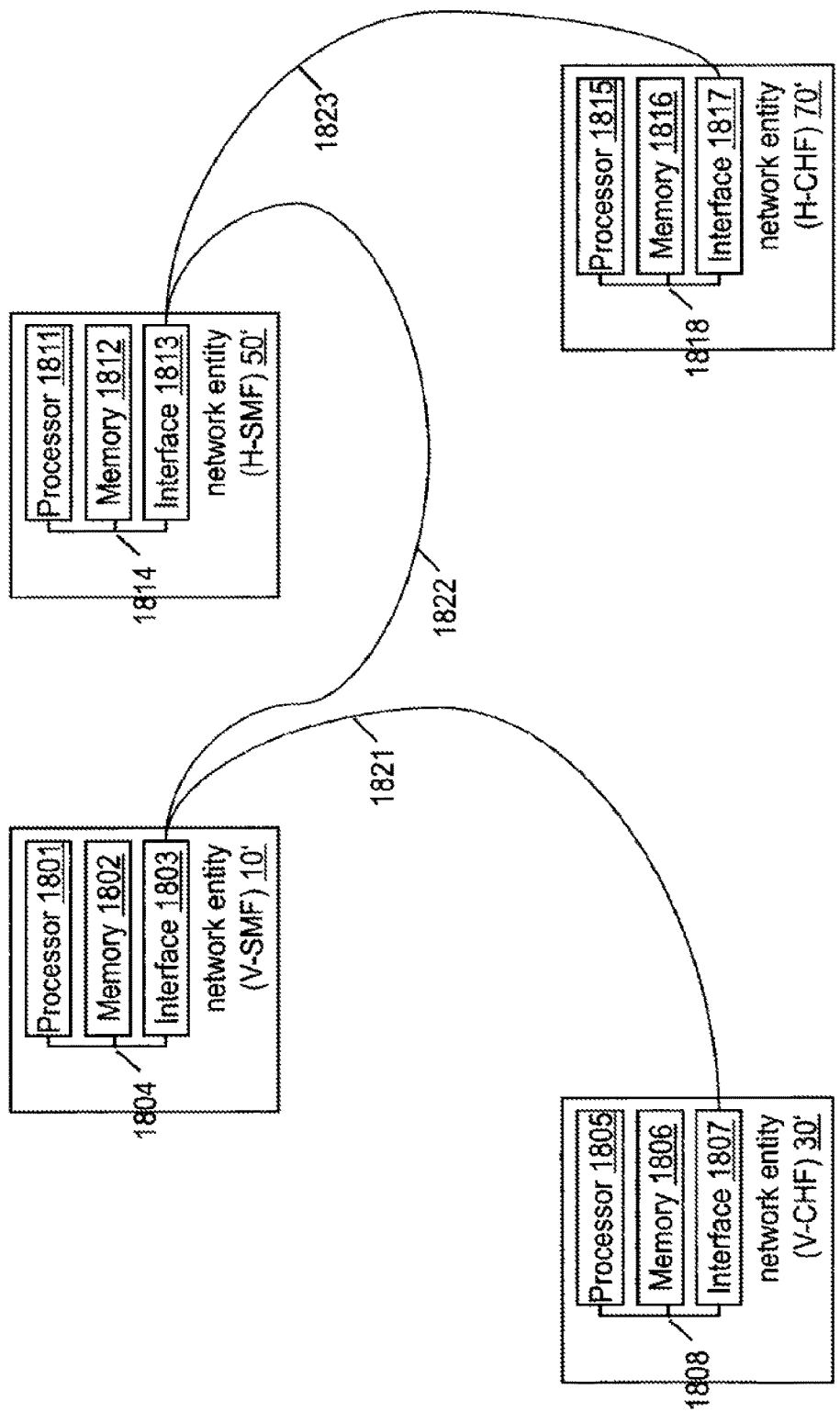
FIG. 18 is a block diagram alternatively illustrating apparatuses according to exemplary embodiments of the present invention.

In FIG. 18, an alternative illustration of apparatuses according to exemplary embodiments of the present invention is depicted. As indicated in FIG. 18, according to exemplary embodiments of the present invention, the apparatus (network entity) 10' (corresponding to the network entity 10) comprises a processor 1801, a memory 1802 and an interface 1803, which are connected by a bus 1804 or the like. Further, according to exemplary embodiments of the present invention, the apparatus (network entity) 30' (corresponding to the network entity 30) comprises a processor 1805, a memory 1806 and an interface 1807, which are connected by a bus 1808 or the like, and the apparatuses may be connected via link 1821, respectively.

Further, according to exemplary embodiments of the present invention, the apparatus (network entity) 50' (corresponding to the network entity 50) comprises a processor 1811, a memory 1812 and an interface 1813, which are connected by a bus 1814 or the like. Further, according to exemplary embodiments of the present invention, the apparatus (network entity) 70' (corresponding to the network entity 70) comprises a processor 1815, a memory 1816 and an interface 1817, which are connected by a bus 1818 or the like, and the apparatuses may be connected via link 1823, respectively.

Apparatuses 10' (corresponding to the network entity 10) and 50' (corresponding to the network entity 50) may be connected via link 1822, respectively.

The processor 1801/1805/1811/1815 and/or the interface 1803/1807/1813/1817 may also include a modem or the like to facilitate communication over a (hardwire or wireless) link, respectively. The interface 1803/1807/1813/1817 may include a suitable transceiver coupled to one or more antennas or communication means for (hardwire or wireless) communications with the linked or connected device(s), respectively. The interface 1803/1807/1813/1817 is generally configured to communicate with at least one other apparatus, i.e. the interface thereof.

The memory 1802/1806/1812/1816 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network entity 10 (of a first session management entity of a first mobile network in a roaming charging related scenario between said first mobile network and a second mobile network) comprises at least one processor 1801, at least one memory 1802 including computer program code, and at least one interface 1803 configured for communication with at least another apparatus. The processor (i.e. the at least one processor 1801, with the at least one memory 1802 and the computer program code) is configured to perform transmitting a session creation request message to a second session management entity of said second mobile network, said session creation request message including information indicative of a first configuration utilized for mobile network related charging (thus the apparatus comprising corresponding means for transmitting), and to perform receiving a session creation response message from said second session management entity of said second mobile network, said session creation response message including information indicative of a second configuration utilized for mobile network related charging (thus the apparatus comprising corresponding means for receiving).

According to exemplary embodiments of the present invention, an apparatus representing the network entity 30 (of a charging entity of a first mobile network in a roaming charging related scenario between said first mobile network and a second mobile network) comprises at least one processor 1805, at least one memory 1806 including computer program code, and at least one interface 1807 configured for communication with at least another apparatus. The processor (i.e. the at least one processor 1805, with the at least one memory 1806 and the computer program code) is configured to perform receiving, from a session management entity of said first mobile network, a charging initiation request message (thus the apparatus comprising corresponding means for receiving), and to perform transmitting, to said session management entity of said first mobile network, a charging initiation response message, said charging initiation response message being indicative of success of a generation of partial charging data records in said first mobile network and including information indicative of a first configuration utilized for mobile network related charging (thus the apparatus comprising corresponding means for transmitting).

According to exemplary embodiments of the present invention, an apparatus representing the network entity 50 (of a second session management entity of a second mobile network in a roaming charging related scenario between a first mobile network and said second mobile network) comprises at least one processor 1811, at least one memory 1812 including computer program code, and at least one interface 1813 configured for communication with at least another apparatus. The processor (i.e. the at least one processor 1811, with the at least one memory 1812 and the computer program code) is configured to perform receiving, from a first session management entity of said first mobile network, a session creation request message, said session creation request message including information indicative of a first configuration utilized for mobile network related charging (thus the apparatus comprising corresponding means for receiving), and to perform transmitting, to said first session management entity of said first mobile network, a session creation response message, said session creation response message including information indicative of a second configuration utilized for mobile network related charging (thus the apparatus comprising corresponding means for transmitting).

According to exemplary embodiments of the present invention, an apparatus representing the network entity 70 (of a charging entity of a second mobile network in a roaming charging related scenario between a first mobile network and said second mobile network) comprises at least one processor 1815, at least one memory 1816 including computer program code, and at least one interface 1817 configured for communication with at least another apparatus. The processor (i.e. the at least one processor 1815, with the at least one memory 1816 and the computer program code) is configured to perform receiving, from a session management entity of said second mobile network, a charging initiation request message, said charging initiation request message including information indicative of a first configuration utilized for mobile network related charging for generation of partial charging data records in said second mobile network (thus the apparatus comprising corresponding means for receiving), and to perform transmitting, to said session management entity of said second mobile network, a charging initiation response message, said charging initiation response message being indicative of success of said generation of said partial charging data records in said second mobile network and including information indicative of said second configuration utilized for mobile network related charging (thus the apparatus comprising corresponding means for transmitting).

For further details regarding the operability/functionality of the individual apparatuses, reference is made to the above description in connection with any one of FIGS. 1 to 17, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for coordinated session charging in roaming scenarios. Such measures (of a first session management entity of a first mobile network in a roaming charging related scenario between said first mobile network and a second mobile network) exemplarily comprise transmitting a session creation request message to a second session management entity of said second mobile network, said session creation request message including information indicative of a first configuration utilized for mobile network related charging, and receiving a session creation response message from said second session management entity of said second mobile network, said session creation response message including information indicative of a second configuration utilized for mobile network related charging.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP $3^{rd}$ Generation Partnership Project
AMF Access and Mobility Management Function
CC charging characteristics
CDR charging data record
CHF charging function
EPC Evolved Packet Core
EU European Union GSMA Global System for Mobile communication Association
H-PLMN Home Public Land Mobile Network
IP internet protocol
IP-CAN IP connectivity access network
LTE Long Term Evolution
NF network function
NR New Radio
NRF NF Repository Function
PCF Policy Control Function
PDU protocol data unit
SMF session management function
SMS short message service
SUPI Subscription Permanent Identifier
TAP transfer account procedure
TS Technical Specification
UDM Unified Data Management
V-PLMN Visited Public Land Mobile Network

The invention claimed is:

1. A method of a visited session management entity of a visited public land mobile network in a roaming charging related scenario between said visited public land mobile network and a home public land mobile network, the method comprising:
receiving a session establishment request indication message;
discovering a charging entity of said visited public land mobile network;
transmitting a charging initiation request message to said charging entity of said visited public land mobile network for generation of partial charging data records in said visited public land mobile network;
receiving a charging initiation response message from said charging entity of said visited public land mobile network, said charging initiation response message being indicative of success of said generation of said partial charging data records in said visited public land mobile network and including information indicative of a first configuration utilized for mobile network related charging;
transmitting a session creation request message to a home session management entity of said home public land mobile network, said session creation request message including said information indicative of said first configuration utilized for mobile network related charging;
receiving a session creation response message from said home session management entity of said home public land mobile network, said session creation response message including information indicative of a second configuration utilized for mobile network related charging;
transmitting a charging update request message to said charging entity of said visited public land mobile network for updating said generation of said partial charging data records in said visited public land mobile network, said charging update request message including said information indicative of said second configuration utilized for mobile network related charging; and
receiving a charging update response message from said charging entity of said visited public land mobile network, said charging update response message being indicative of success of said updating of said generation of said partial charging data records in said visited public land mobile network, wherein
in relation to said discovering, said method further comprises transmitting, to a repository entity of said visited public land mobile network, a discovery request message indicative of a predetermined charging functionality; and
receiving, from said repository entity of said visited public land mobile network, a discovery response message indicative of said charging entity of said visited public land mobile network, said charging entity of said visited public land mobile network providing said predetermined charging functionality.

2. The method according to claim 1, wherein
said charging entity is a visited charging function, or
said first configuration is a roaming charging profile, or
said second configuration is a roaming charging profile, or
said partial charging data record is a partial roaming session management function protocol data unit charging data record, or
said repository entity is a network function repository function, or
said predetermined charging functionality is a roaming quality of service flow based charging functionality.

3. A method of a home session management entity of a home public land mobile network in a roaming charging related scenario between a visited public land mobile network and said home public land mobile network, the method comprising:
receiving, from a visited session management entity of said visited public land mobile network, a session creation request message, said session creation request message including information indicative of a first configuration utilized for mobile network related charging;
discovering a charging entity of said home public land mobile network;
transmitting a charging initiation request message to said charging entity of said home public land mobile network, said charging initiation request message including said information indicative of said first configuration utilized for mobile network related charging for generation of partial charging data records in said home public land mobile network;
receiving a charging initiation response message from said charging entity of said home public land mobile network, said charging initiation response message being indicative of success of said generation of said partial charging data records in said home public land mobile network and including information indicative of a second configuration utilized for mobile network related charging; and
transmitting, to said visited session management entity of said visited public land mobile network, a session creation response message, said session creation response message including said information indicative of said second configuration utilized for mobile network related charging, wherein
in relation to said discovering, said method further comprises:
transmitting, to a repository entity of said home public land mobile network, a discovery request message indicative of a predetermined charging functionality; and
receiving, from said repository entity of said home public land mobile network, a discovery response message indicative of said charging entity of said home public land mobile network, said charging entity of said home public land mobile network providing said predetermined charging functionality.

4. The method according to claim 3, wherein
said charging entity is a home charging function, or
said first configuration is a roaming charging profile, or
said second configuration is a roaming charging profile, or
said partial charging data record is a partial roaming session management function protocol data unit charging data record, or
said repository entity is a network function repository function, or
said predetermined charging functionality is a roaming quality of service flow based charging functionality.

5. An apparatus of a visited session management entity of a visited public land mobile network in a roaming charging related scenario between said visited public land mobile network and a home public land mobile network, the apparatus comprising:
at least one processor;
at least one memory including computer program code; and
at least one interface configured for communication with at least another apparatus;
the at least one processor, with the at least one memory and the computer program code, being configured to cause the apparatus to perform:
receiving a session establishment request indication message;
discovering a charging entity of said visited public land mobile network;
transmitting a charging initiation request message to said charging entity of said visited public land mobile network for generation of partial charging data records in said visited public land mobile network;
receiving a charging initiation response message from said charging entity of said visited public land mobile network, said charging initiation response message being indicative of success of said generation of said partial charging data records in said visited public land mobile network and including information indicative of a first configuration utilized for mobile network related charging;
transmitting a session creation request message to a home session management entity of said home public land mobile network, said session creation request message including said information indicative of said first configuration utilized for mobile network related charging;
receiving a session creation response message from said home session management entity of said home public mobile network, said session creation response message including information indicative of a second configuration utilized for mobile network related charging;
transmitting a charging update request message to said charging entity of said visited public land mobile network for updating said generation of said partial charging data records in said visited public land mobile network, said charging update request message including said information indicative of said second configuration utilized for mobile network related charging; and
receiving a charging update response message from said charging entity of said visited public land mobile network, said charging update response message being indicative of success of said updating of said generation of said partial charging data records in said visited public land mobile network, wherein
in relation to said discovering, the at least one processor, with the at least one memory and the computer program code, is configured to cause the apparatus to perform:
transmitting, to a repository entity of said visited public land mobile network, a discovery request message indicative of a predetermined charging functionality; and
receiving, from said repository entity of said visited public land mobile network, a discovery response message indicative of said charging entity of said visited public land mobile network, said charging entity of said visited public land mobile network providing said predetermined charging functionality.

6. The apparatus according to claim 5, wherein
said charging entity is a visited charging function, or
said first configuration is a roaming charging profile, or
said second configuration is a roaming charging profile, or
said partial charging data record is a partial roaming session management function protocol data unit charging data record, or
said repository entity is a network function repository function, or
said predetermined charging functionality is a roaming quality of service flow based charging functionality.

7. An apparatus of a home session management entity of a home public land mobile network in a roaming charging related scenario between a visited public land mobile network and said home public land mobile network, the apparatus comprising:
at least one processor,
at least one memory including computer program code, and
at least one interface configured for communication with at least another apparatus,
the at least one processor, with the at least one memory and the computer program code, being configured to cause the apparatus to perform:
receiving, from a visited session management entity of said visited public land mobile network, a session creation request message, said session creation request message including information indicative of a first configuration utilized for mobile network related charging;
discovering a charging entity of said home public land mobile network;
transmitting a charging initiation request message to said charging entity of said home public land mobile network, said charging initiation request message including said information indicative of said first configuration utilized for mobile network related charging for generation of partial charging data records in said home public land mobile network;
receiving a charging initiation response message from said charging entity of said home public land mobile network, said charging initiation response message being indicative of success of said generation of said partial charging data records in said home public land mobile network and including information indicative of a second configuration utilized for mobile network related charging; and
transmitting, to said visited session management entity of said visited public land mobile network, a session creation response message, said session creation response message including said information indicative of said second configuration utilized for mobile network related charging, wherein
in relation to said discovering, the at least one processor, with the at least one memory and the computer program code, is configured to cause the apparatus to perform:

transmitting, to a repository entity of said home public land mobile network, a discovery request message indicative of a predetermined charging functionality; and receiving, from said repository entity of said home public land mobile network, a discovery response message indicative of said charging entity of said home public land mobile network, said charging entity of said home mobile network providing said predetermined charging functionality.

8. The apparatus according to claim 7, wherein
said charging entity is a home charging function, or
said first configuration is a roaming charging profile, or
said second configuration is a roaming charging profile, or
said partial charging data record is a partial roaming session management function protocol data unit charging data record, or
said repository entity is a network function repository function, or
said predetermined charging functionality is a roaming quality of service flow based charging functionality.

9. A computer program embodied on a non-transitory computer-readable medium, said computer program comprising computer-executable computer program code which, when the program is run on a computer, is configured to cause the computer to carry out the method according to claim 1.

10. A computer program embodied on a non-transitory computer-readable medium, said computer program comprising computer-executable computer program code which, when the program is run on a computer, is configured to cause the computer to carry out the method according to claim 3.

* * * * *